United States Patent
Chasteen et al.

(10) Patent No.: US 12,056,654 B1
(45) Date of Patent: Aug. 6, 2024

(54) METHOD AND SYSTEM FOR CUSTOMIZED CONFIGURATION OF A SHIPPER FOR TRANSPORTING TEMPERATURE-SENSITIVE MATERIALS

(71) Applicant: Cold Chain Technologies, Inc., Franklin, MA (US)

(72) Inventors: James Robert Chasteen, Grosse Pointe Farms, MI (US); Anthony Rizzo, Grafton, MA (US); TzeHo Lee, Needham, MA (US); Geoffrey Kaiser, Westborough, MA (US); Jeena Kulangara, Framingham, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 111 days.

(21) Appl. No.: 16/246,435

(22) Filed: Jan. 11, 2019

Related U.S. Application Data

(60) Provisional application No. 62/616,170, filed on Jan. 11, 2018.

(51) Int. Cl.
*G06Q 10/0834* (2023.01)
*G06Q 10/04* (2023.01)
(Continued)

(52) U.S. Cl.
CPC ......... *G06Q 10/0834* (2013.01); *G06Q 10/04* (2013.01); *G06Q 10/08* (2013.01);
(Continued)

(58) Field of Classification Search
None
See application file for complete search history.

(56) References Cited

U.S. PATENT DOCUMENTS

| 5,450,977 A | 9/1995 | Moe |
| 5,501,338 A | 3/1996 | Preston |

(Continued)

OTHER PUBLICATIONS

Li, Susan; "Cold-chain packaging: a new, holistic approach to packaging optimization and small-package cost management"; Published 2014; UPS; pp. 1-16 (Year: 2014).*

(Continued)

*Primary Examiner* — Emmett K. Walsh
*Assistant Examiner* — Michael C Moroney
(74) *Attorney, Agent, or Firm* — KRIEGSMAN & KRIEGSMAN

(57) ABSTRACT

Method and system for customized configuration of a shipper for transporting temperature-sensitive materials. In one embodiment, a webpage application is used to allow a user to input certain information. Such information may include the shipping origin zip code, the shipping destination zip code, an indication of the courier used to transport the shipper, an indication of the desired temperature range at which the materials are to be maintained by the shipper, and an indication of the maximum payload size desired. Based on the inputted information and a selection methodology that determines the average ambient temperature to which the shipper will likely be exposed, a shipper is then selected from among a pre-selected collection of possible shipper configurations. Such a collection may include, for example, configurations designed to protect against hot ambient temperatures, cold ambient temperatures and intermediate ambient temperatures.

10 Claims, 14 Drawing Sheets

(51) Int. Cl.
  *G06Q 10/08* (2024.01)
  *G06Q 10/0832* (2023.01)
  *G06Q 10/0835* (2023.01)
  *B65D 81/38* (2006.01)
  *F25D 3/08* (2006.01)

(52) U.S. Cl.
  CPC ... *G06Q 10/0832* (2013.01); *G06Q 10/08355* (2013.01); *B65D 81/38* (2013.01); *F25D 3/08* (2013.01); *F25D 2331/804* (2013.01)

(56) References Cited

U.S. PATENT DOCUMENTS

| | | | |
|---|---|---|---|
| 5,709,307 | A | 1/1998 | Rosado et al. |
| 5,897,017 | A | 4/1999 | Lantz |
| 5,899,088 | A | 5/1999 | Purdum |
| 5,924,302 | A | 7/1999 | Derifield |
| 6,044,650 | A | 4/2000 | Cook et al. |
| 6,116,042 | A | 9/2000 | Purdum |
| 6,192,703 | B1 | 2/2001 | Salyer et al. |
| 6,244,458 | B1 | 6/2001 | Frysinger et al. |
| 6,257,764 | B1 | 7/2001 | Lantz |
| 6,482,332 | B1 | 11/2002 | Malach |
| 6,868,982 | B2 | 3/2005 | Gordon |
| 6,875,486 | B2 | 4/2005 | Miller |
| 7,257,963 | B2 | 8/2007 | Mayer |
| 7,294,374 | B2 | 11/2007 | Romero |
| 7,849,708 | B2 | 12/2010 | Goncharko |
| 7,908,870 | B2 | 3/2011 | Williams et al. |
| 7,950,246 | B1 | 5/2011 | Mayer et al. |
| 8,074,465 | B2 | 12/2011 | Heroux et al. |
| 8,250,882 | B2 | 8/2012 | Mustafa et al. |
| 8,326,679 | B1 * | 12/2012 | Rowe ............... G06Q 10/08 705/7.38 |
| 8,600,903 | B2 | 12/2013 | Eller |
| 8,938,986 | B2 | 1/2015 | Matta et al. |
| 9,045,278 | B2 | 6/2015 | Mustafa et al. |
| 9,598,622 | B2 | 3/2017 | Formato et al. |
| 9,981,797 | B2 * | 5/2018 | Aksan ............... B65D 81/3858 |
| 10,605,674 | B1 * | 3/2020 | Holbrook ............... B65D 81/38 |
| 10,909,492 | B1 * | 2/2021 | Reinhardt ........... G06Q 10/0833 |
| 2003/0102317 | A1 | 6/2003 | Gordon |
| 2005/0224501 | A1 | 10/2005 | Folkert et al. |
| 2008/0164265 | A1 * | 7/2008 | Conforti ............ B65D 81/3823 220/592.2 |
| 2008/0276643 | A1 * | 11/2008 | Heroux ..................... F25D 3/06 220/592.2 |
| 2008/0291033 | A1 * | 11/2008 | Aghassipour .......... G06Q 10/08 340/584 |
| 2008/0308452 | A1 * | 12/2008 | Eller ..................... G06Q 10/08 206/756 |
| 2010/0299278 | A1 * | 11/2010 | Kriss ..................... G06Q 10/08 705/332 |
| 2012/0197810 | A1 * | 8/2012 | Haarmann ................ F25D 3/08 705/302 |
| 2012/0248101 | A1 * | 10/2012 | Tumber ..................... F25D 3/08 53/473 |
| 2012/0305435 | A1 * | 12/2012 | Matta ................. B65D 81/3862 206/521 |
| 2013/0325737 | A1 * | 12/2013 | Smalling ............. G06Q 10/083 705/330 |
| 2016/0060016 | A1 * | 3/2016 | Angelozzi ................ A47B 5/02 220/592.2 |
| 2016/0338908 | A1 * | 11/2016 | Rice ....................... H04Q 9/00 |
| 2017/0083856 | A1 * | 3/2017 | Song ................. G06Q 10/0832 |
| 2017/0300855 | A1 * | 10/2017 | Lund ..................... B64C 39/024 |
| 2018/0086539 | A1 * | 3/2018 | Aksan ............... B65D 81/3862 |
| 2018/0093816 | A1 | 4/2018 | Longley et al. |
| 2018/0328644 | A1 | 11/2018 | Rizzo et al. |
| 2019/0137162 | A1 * | 5/2019 | Ominsky ............. F25D 11/003 |
| 2019/0301794 | A1 * | 10/2019 | Esser ................... F25D 29/003 |
| 2019/0315553 | A1 * | 10/2019 | Fiflis ................... B65D 81/18 |

OTHER PUBLICATIONS

World Health Organization; "Transport route profiling qualification"; published 2015; WHO Press; WHO Technical Report Series, No. 992, Annex 5 Supplement 14; pp. 1-32 (Year: 2015).*

* cited by examiner

Fig. 4(a)

| Pack-Out Size | Pack-Out Number | Payload Temperature | Switch Temperatures | | Pack-Out Temperature | Components | | | |
|---|---|---|---|---|---|---|---|---|---|
| | | | Cold to Moderate [C] | Moderate to Hot [C] | | Gel Temperatures | | | Bubble Wrap Layers |
| | | | | | | Frozen | Refrigerated | Room Temp | |
| 3L | KT867-CISU | Refrigerated | 10 | 18 | Cold | 1 | 1 | 0 | 2 |
| | | | | | Moderate | 2 | 1 | 0 | 6 |
| | | | | | Hot | 3 | 0 | 0 | 4 |
| | | Room Temp | 16 | 24 | Cold | 0 | 0 | 4 | 0 |
| | | | | | Moderate | 0 | 0 | 2 | 0 |
| | | | | | Hot | 0 | 3 | 2 | 0 |
| 5L | KT889-CISU | Refrigerated | 8 | 18 | Cold | 1 | 1 | 0 | 2 |
| | | | | | Moderate | 2 | 1 | 0 | 6 |
| | | | | | Hot | 3 | 0 | 0 | 4 |
| | | Room Temp | 14 | 24 | Cold | 0 | 0 | 5 | 0 |
| | | | | | Moderate | 0 | 0 | 4 | 0 |
| | | | | | Hot | 0 | 3 | 3 | 0 |
| 8L | KT12109-CISU | Refrigerated | 10 | 20 | Cold | 2 | 2 | 0 | 2 |
| | | | | | Moderate | 4 | 2 | 0 | 6 |
| | | | | | Hot | 6 | 0 | 0 | 4 |
| | | Room Temp | 14 | 24 | Cold | 0 | 0 | 7 | 0 |
| | | | | | Moderate | 0 | 0 | 4 | 0 |
| | | | | | Hot | 0 | 4 | 3 | 0 |
| 15L | KT91-CISU | Refrigerated | 8 | 22 | Cold | 3 | 3 | 0 | 2 |
| | | | | | Moderate | 5 | 1 | 0 | 6 |
| | | | | | Hot | 8 | 0 | 0 | 8 |
| | | Room Temp | 13 | 26 | Cold | 0 | 0 | 7 | 0 |
| | | | | | Moderate | 0 | 0 | 6 | 0 |
| | | | | | Hot | 0 | 5 | 3 | 1 |

Fig. 5

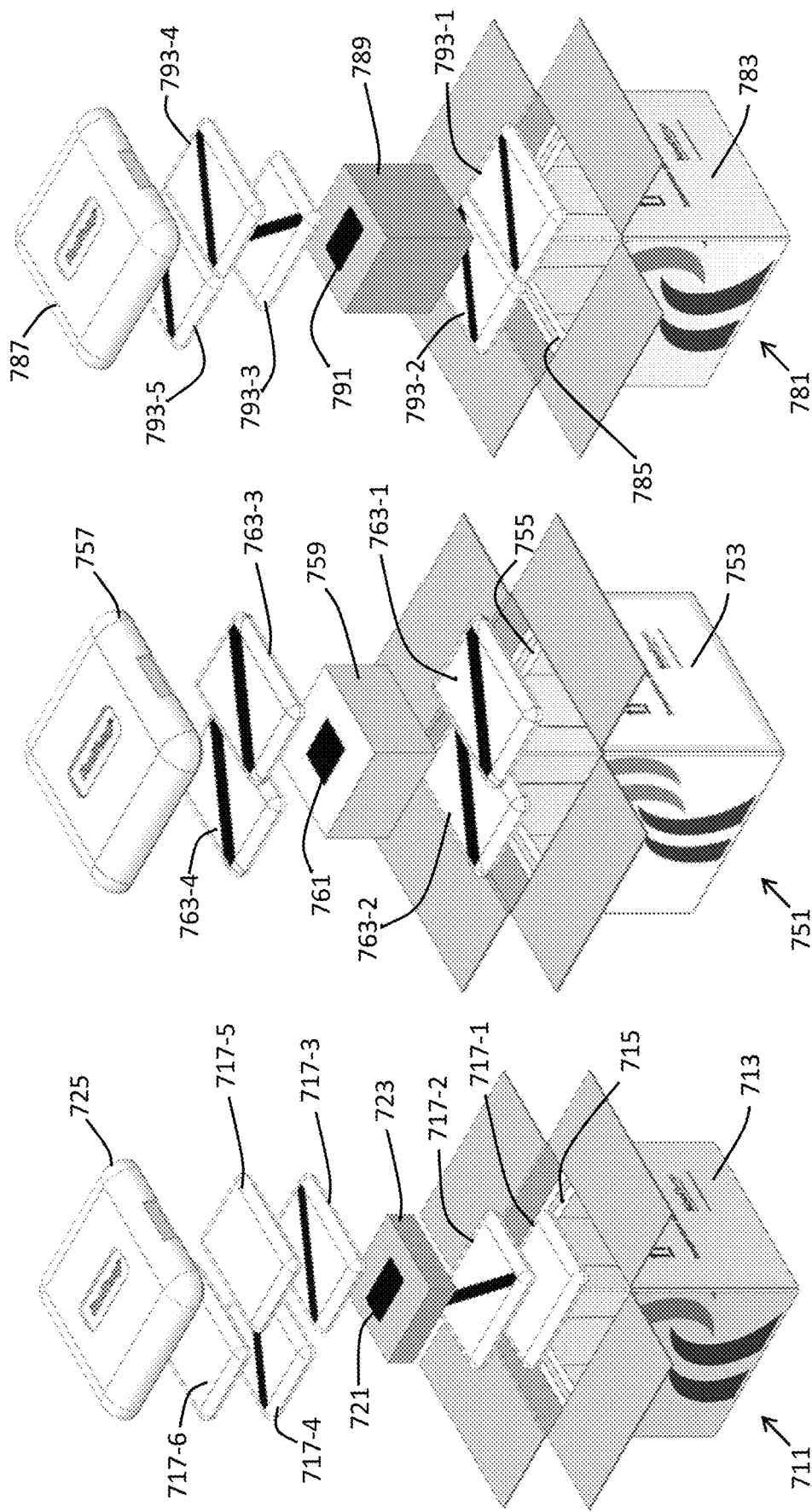

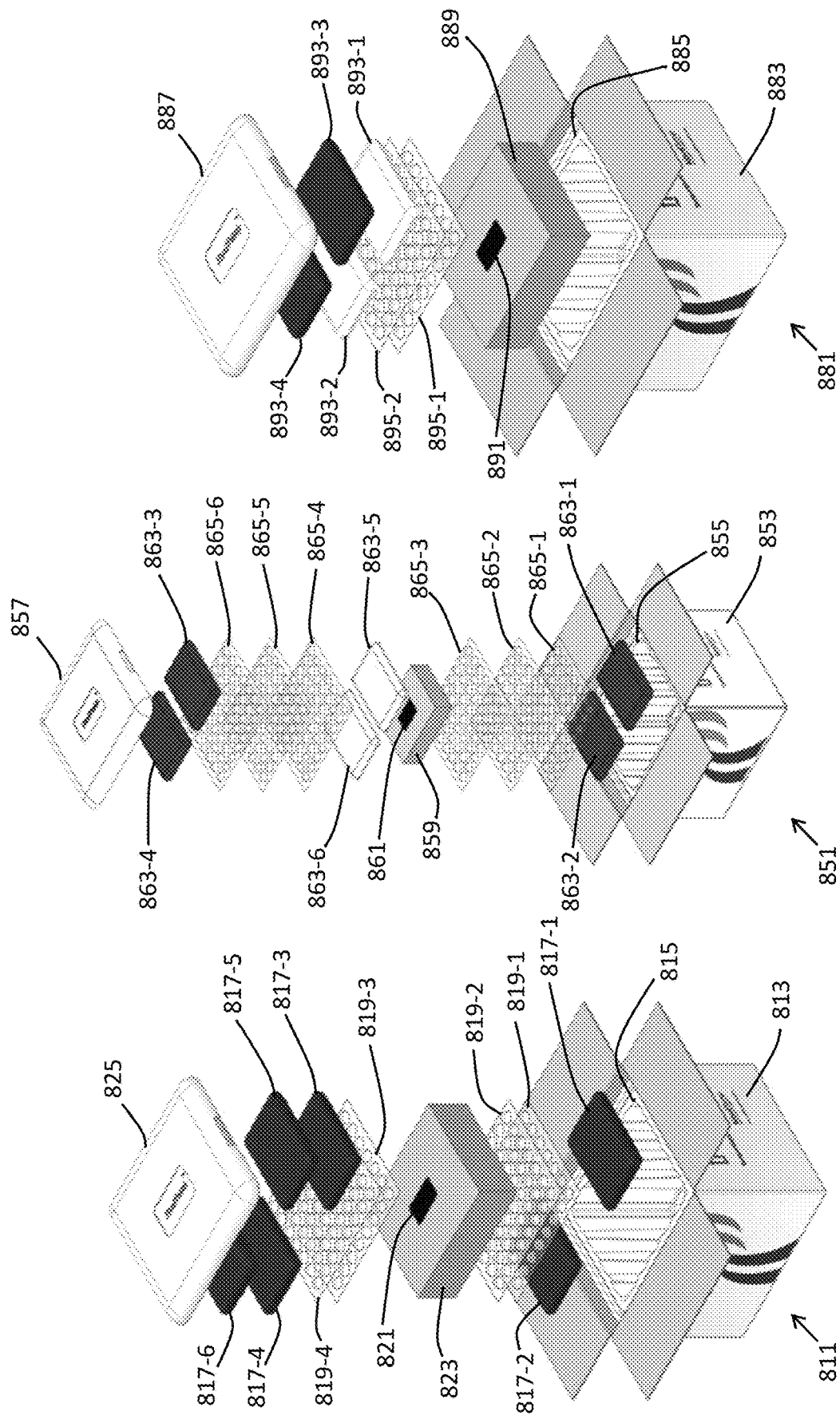

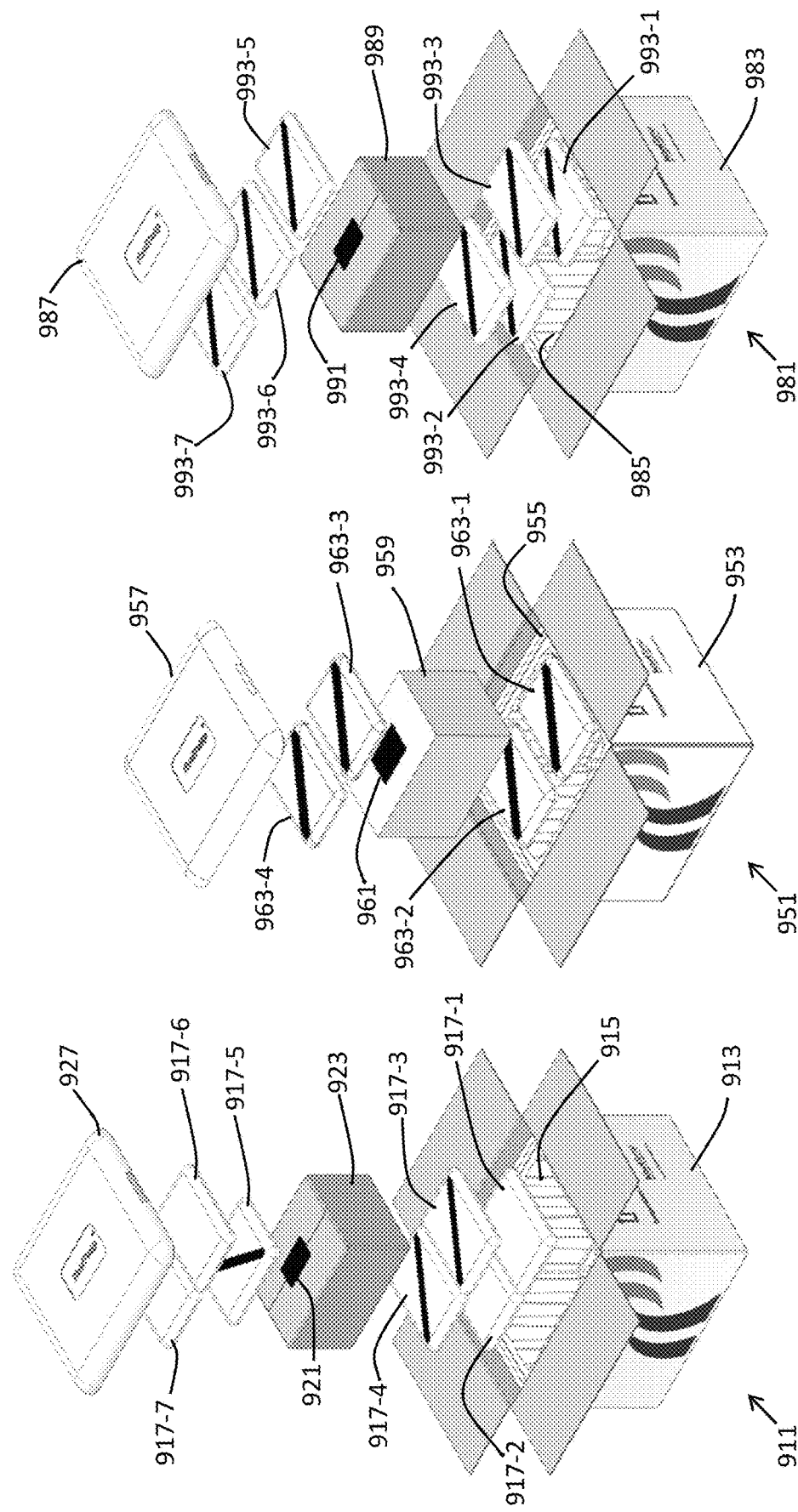

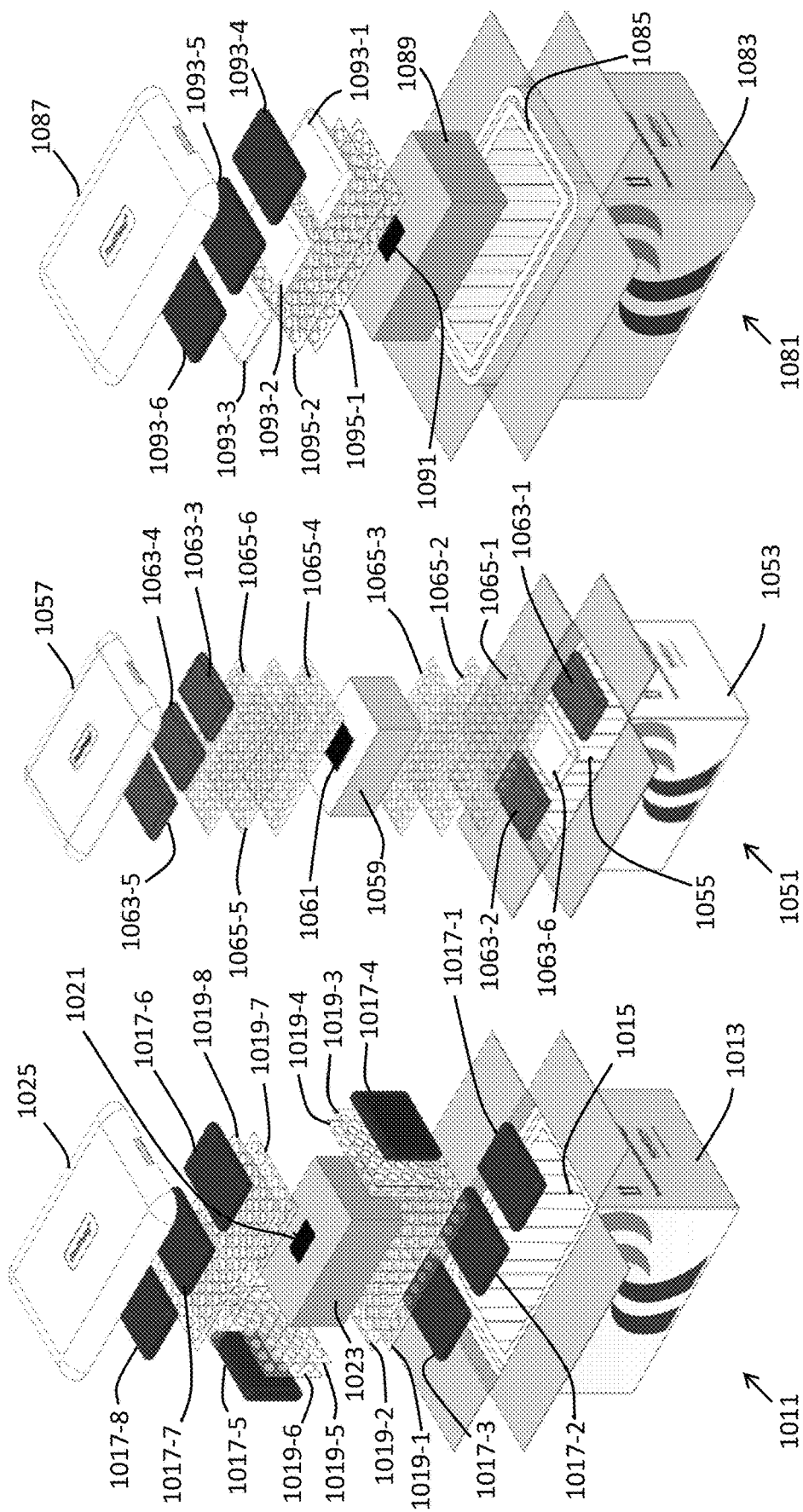

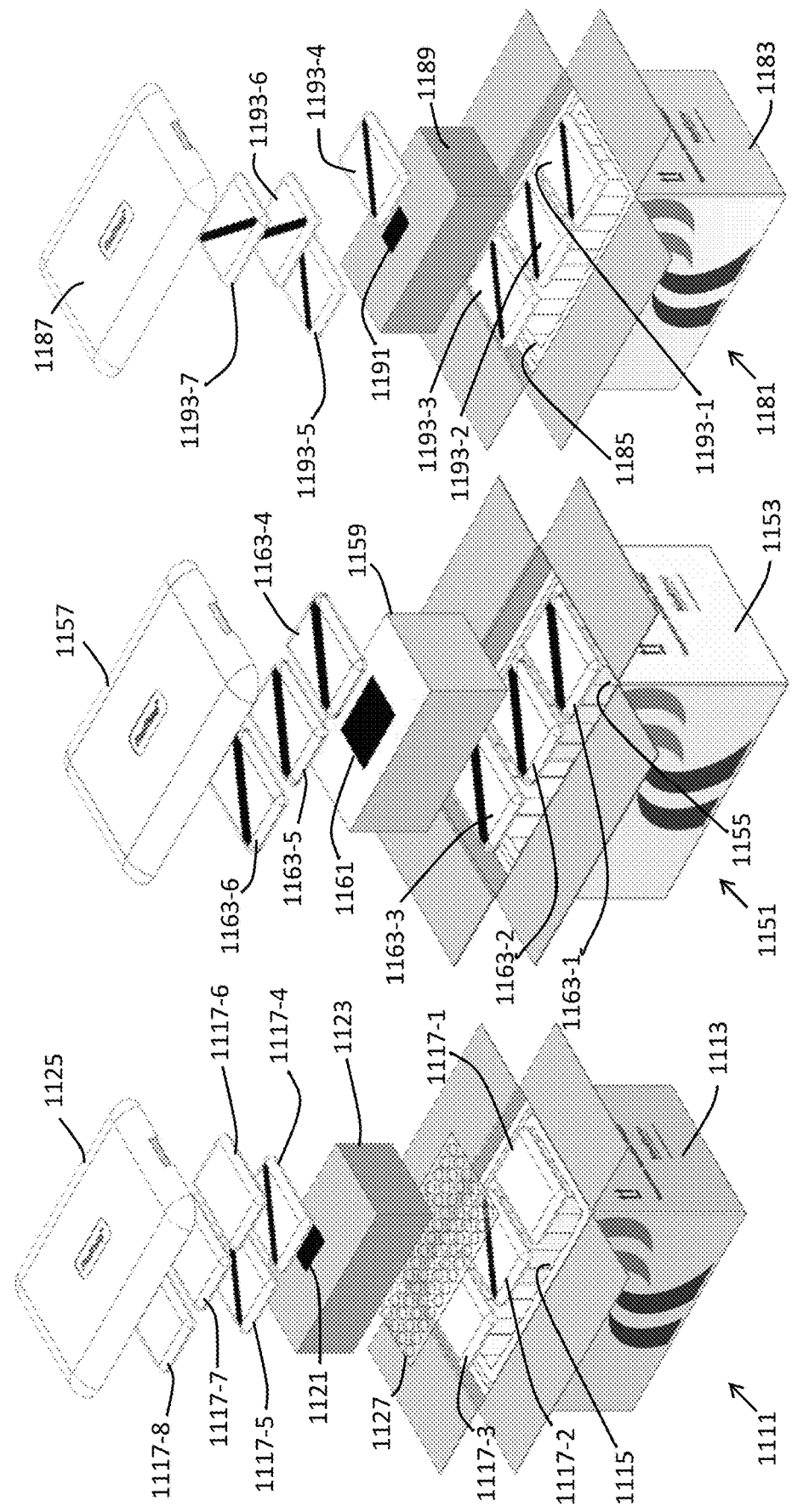

METHOD AND SYSTEM FOR CUSTOMIZED CONFIGURATION OF A SHIPPER FOR TRANSPORTING TEMPERATURE-SENSITIVE MATERIALS

CROSS-REFERENCE TO RELATED APPLICATIONS

The present application claims the benefit under 35 U.S.C. 119(e) of U.S. Provisional Patent Application No. 62/616,170, inventors James Robert Chasteen et al., filed Jan. 11, 2018, the disclosure of which is incorporated herein by reference.

BACKGROUND OF THE INVENTION

The present invention is directed generally at shippers designed to transport temperature-sensitive materials and is directed more particularly at a method and system for customized configuration of a shipper for transporting temperature-sensitive materials.

It is often desirable to store and/or to transport temperature-sensitive materials, examples of such materials including, but not being limited to, pharmaceuticals, biological materials, foods, beverages, and the like. As a result, various types of shipping systems (also referred to herein as "shippers") for storing and/or transporting such materials have been devised, some of these shipping systems being parcel-sized shipping systems and some of these shipping systems being pallet-sized shipping systems. Typically, such parcel-sized shipping systems include an insulated container having a cavity for receiving a temperature-sensitive material. Often, the temperature-sensitive material is housed within a product or payload container, the product or payload container (with the temperature-sensitive material disposed therewithin) being placed in the cavity of the insulated container. Such shipping systems often also include a phase-change material, typically disposed within the cavity of the insulated container within a suitable phase-change material receptacle, such as a bag or bottle, for maintaining the temperature-sensitive material above a particular temperature, below a particular temperature, or within a particular temperature range (such as, but not limited, to +2° C. to +8° C., +15° C. to +25° C., or −15° C. to −25° C.). An example of a common phase-change material is water, which has a solid/liquid phase change temperature of 0° C. Other common phase-change materials include a mixture of water and a thickener (e.g., a polysaccharide thickener) to produce a gelled water mixture, a water/salt solution with an optional thickener, dry ice, and various organic phase-change materials, such as are disclosed in U.S. Pat. No. 9,598,622 B2, inventors Formato et al., which issued Mar. 21, 2017, and U.S. Patent Application Publication No. US 2018/0093816 A1, inventors Longley et al., which was published Apr. 5, 2018, both of which are incorporated herein by reference.

An example of a parcel-sized shipping system of the type described above is illustrated by U.S. Pat. No. 6,868,982, inventor Gordon, which issued, Mar. 22, 2005, and which is incorporated herein by reference. According to this patent, there is disclosed an insulated shipping container and a method of making the same. In a preferred embodiment, the insulated shipping container comprises an outer box, an insulated insert, an inner box, and a closure member. The outer box, which is preferably made of corrugated fiberboard, comprises a rectangular prismatic cavity bounded by a plurality of rectangular side walls, a closed bottom end, and top closure flaps. The insulated insert is snugly, but removably, disposed within the outer box and is shaped to define a rectangular prismatic cavity bounded by a bottom wall and a plurality of rectangular side walls, the insulated insert having an open top end. The insulated insert is made of a foamed polyurethane body to which on all sides, except its bottom, a thin, flexible, unfoamed polymer bag is integrally bonded. The bag is a unitary structure having a generally uniform rectangular shape, the bag being formed by sealing shut one end of a tubular member with a transverse seam and forming longitudinal creases extending from opposite ends of the seam. The inner box, which is snugly, but removably, disposed within the insert, is preferably made of corrugated fiberboard and is shaped to include a rectangular prismatic cavity bounded by a plurality of rectangular side walls and a closed bottom end, the top end thereof being open. The closure member is a thick piece of foam material snugly, but removably, disposed in the open end of the inner box. In use, a temperature sensitive material is placed in the inner box, together with dry ice or some other temperature-stabilizing material.

Other documents of interest may include the following, all of which are incorporated herein by reference: U.S. Pat. No. 9,045,278, inventors Mustafa et al., which issued Jun. 2, 2015; U.S. Pat. No. 8,250,882, inventors Mustafa et al., issued Aug. 28, 2012; U.S. Pat. No. 5,897,017, inventor Lantz, issued Apr. 27, 1999; U.S. Pat. No. 6,257,764, inventor Lantz, issued Jul. 10, 2001; U.S. Pat. No. 5,924,302, inventor Derifield, issued Jul. 20, 1999; U.S. Pat. No. 6,044,650, inventors Cook et al., issued Apr. 4, 2000; U.S. Pat. No. 5,709,307, inventors Rosado et al., issued Jan. 20, 1998; U.S. Pat. No. 5,450,977, inventor Moe, issued Sep. 19, 1995; U.S. Pat. No. 5,501,338, inventor Preston, issued Mar. 26, 1996; U.S. Pat. No. 6,244,458, inventors Frysinger et al., issued Jun. 12, 2001; U.S. Pat. No. 6,192,703, inventors Salyer et al., issued Feb. 27, 2001; U.S. Pat. No. 7,950,246, inventors Mayer et al., issued May 31, 2011; U.S. Patent Application Publication No. US 2018/0328644 A1, inventors Rizzo et al., published Nov. 15, 2018; U.S. Patent Application Publication No. US 2005/0224501 A1, inventors Folkert et al., published Oct. 13, 2005; and U.S. Patent Application Publication No. US 2003/0102317 A1, inventor Gordon, published Jun. 5, 2003.

As can readily be appreciated, the ability to maintain a temperature-sensitive material at, above, or below a desired temperature or within a desired temperature range may be impacted by ambient (i.e., external to the shipper) temperatures. Consequently, it is not uncommon for some shippers, more commonly less expensive shippers, to have both a cold-weather (or "winter") configuration that is better suited for protecting the payload against cold ambient temperatures and a hot-weather (or "summer") configuration that is better suited for protecting the payload against hot ambient temperatures. Such winter and summer configurations may differ from one another, for example, in the type and/or quantity and/or pre-conditioning temperatures of its one or more phase-change materials.

SUMMARY OF THE INVENTION

It is an object of the present invention to provide a novel method and system for configuring a customizable shipper for transporting temperature-sensitive materials According to one aspect of the invention, there is provided a method for customized configuration of a shipper for a shipping party, the shipping party having a compute device, the shipper being adapted to transport temperature-sensitive materials, the method comprising the steps of (a)

electronically receiving shipment parameter data by a central controller, the shipment parameter data being input via the compute device, the shipment parameter data comprising a shipment origin, a shipment destination, a payload size, a desired payload temperature range, and a courier; (b) electronically retrieving data by the central controller relating to an intended shipment travel path based on the shipment origin, the shipment destination, and the courier; (c) electronically retrieving forecasted temperature data by the central controller relating to the intended shipment travel path; (d) calculating an average forecasted ambient temperature by the central controller for the intended shipment travel path; (e) cross-referencing by the central controller of the calculated average forecasted ambient temperature, the inputted payload size, and the inputted desired payload temperature range against a stored shipment solution table to select an optimal shipper; and (f) providing details of the selected optimal shipper to the compute device.

In a more detailed feature of the invention, the stored shipment solution table may comprise a plurality of possible shipper configuration for a given payload size and a given desired payload temperature range. More specifically, the plurality of possible shipper configurations may comprise a hot configuration, where the calculated average forecasted ambient temperature is above a predetermined upper threshold, a cold configuration, where the calculated average forecasted ambient temperature is below a predetermined lower threshold, and a moderate configuration, where the calculated average forecasted ambient temperature is at least as great as the predetermined lower threshold and no greater than the predetermined upper threshold.

In a more detailed feature of the invention, the desired courier may be selected from a plurality of possible couriers comprising at least one ground courier and at least one air courier.

In a more detailed feature of the invention, the desired payload temperature range may be selected from a plurality of possible temperature ranges comprising a refrigerated range and a room temperature range.

In a more detailed feature of the invention, the refrigerated range may be +2° C. to +8° C.

In a more detailed feature of the invention, the room temperature range may be +15° C. to +25° C.

In a more detailed feature of the invention, the forecasted temperature data may be retrieved from a plurality of independent sources.

In a more detailed feature of the invention, the average forecasted ambient temperature is calculated by averaging the forecasted temperature at regular time intervals along the intended shipment travel path.

In a more detailed feature of the invention, the regular time intervals are one-hour intervals.

According to another aspect of the invention, there is provided a system for customized configuration of a shipper for a shipping party, the shipper being adapted to transport temperature-sensitive materials, the system comprising (a) a shipper determiner having a central controller; and (b) a compute device adapted for use by the shipping party, the compute device being in electronic communication with the central controller, wherein shipment parameter data is uploaded onto the central controller using the compute device, the shipment parameter data comprising a shipment origin, a shipment destination, a payload size, a desired payload temperature range and a courier; (c) wherein the central controller retrieves data relating to an intended shipment travel path based on the shipment origin, the shipment destination, and the courier; (d) wherein the central controller retrieves forecasted temperature data relating to the intended shipment travel path; (e) wherein the central controller calculates an average forecasted ambient temperature for the intended shipment travel path; (f) wherein the central controller cross-references the calculated average forecasted ambient temperature, the inputted payload size, and the inputted desired payload temperature range against a stored shipment solution table to select an optimal shipper.

In a more detailed feature of the invention, details of the selected optimal shipper may be accessible by the shipping party using the compute device.

In a more detailed feature of the invention, the data relating to the intended shipment travel path may be retrieved by the central controller from at least one courier compute device in electronic communication therewith.

In a more detailed feature of the invention, the data relating to the forecasted temperature data may be retrieved by the central controller from at least one weather service compute device in electronic communication therewith.

According to another aspect of the invention, there is provided a system comprising (a) a plurality of alternative shipper configurations designed to keep a payload of one or more temperature-sensitive materials of a desired size within a desired temperature range for an extended period of time, one of the alternative shipper configurations being a hot configuration designed to protect the payload against ambient temperatures above an upper limit, one of the alternative shipper configurations being a cold configuration designed to protect the payload against ambient temperatures below a lower limit, and one of the alternative shipper configurations being a moderate configuration designed to protect the payload against ambient temperatures at least as great as the lower limit and no greater than the upper limit; and (b) a shipper selector for use in selecting one of the alternative shipper configurations based on forecasted ambient temperatures to which a shipment is expected to be exposed during travel from an origin to a destination, the shipper selector comprising a central controller, the central controller receiving inputs from a user regarding a payload size, a desired payload temperature, a shipment origin, and a shipment destination and receiving inputs from at least one weather service regarding forecasted temperatures on a travel path between the shipment origin and the shipment destination.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numerals represent like parts:

FIGS. 4(a) and 4(b) are illustrations of the graphical user interface of FIG. 4, the graphical user interface being shown after a shipping party has inputted two different sets of data and submitted the data for a selection;

FIG. 5 is a table illustrating exemplary selection criteria and outcomes for use with the system of FIG. 1;

FIGS. 9(a) through 9(c) are exploded perspective views of alternative shipper configurations of a 3-liter shipper designed to maintain a payload at room temperature;

FIGS. 10(a) through 10(c) are exploded perspective views of alternative shipper configurations of a 8-liter shipper designed to maintain a payload in a refrigerated condition;

FIGS. 11(a) through 11(c) are exploded perspective views of alternative shipper configurations of a 8-liter shipper designed to maintain a payload at room temperature;

FIGS. 12(a) through 12(c) are exploded perspective views of alternative shipper configurations of a 15-liter shipper designed to maintain a payload in a refrigerated condition; and FIGS. 13(a) through 13(c) are exploded perspective views of alternative shipper configurations of a 15-liter shipper designed to maintain a payload at room temperature.

DETAILED DESCRIPTION OF THE INVENTION

Figure 1:
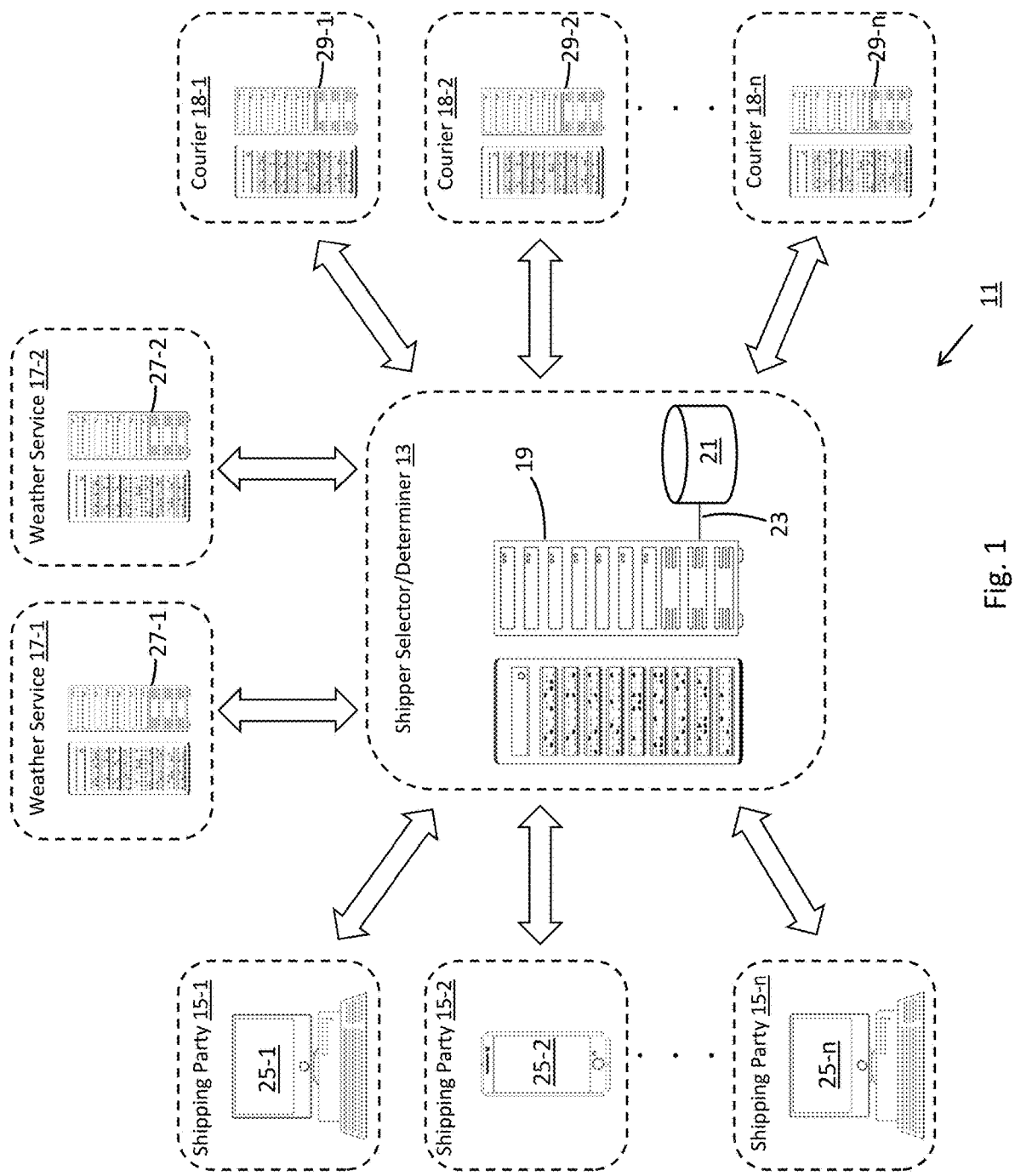
FIG. 1 is a simplified schematic representation of one embodiment of a system for customized configuration of a shipper for transporting temperature-sensitive materials, the system being constructed according to the teachings of the present invention.

As noted above, it is not uncommon for some shippers, most commonly less expensive shippers, to have both a cold-weather (or "winter") configuration and a hot-weather (or "summer") configuration, such seasonal configurations differing from one another, for example, in the type and/or quantity and/or pre-conditioning temperatures of its one or more phase-change materials. Typically, a party using a shipper to transport a payload of temperature-sensitive materials exclusively uses the winter configuration during the colder months of the year and exclusively uses the summer configuration during the warmer months of the year. As a result, at some point between the summer and winter seasons, the party using the shipper will switch from the winter configuration to the summer configuration or vice versa.

The present inventors have identified some disadvantages with the above-described approach. For one thing, it is not always apparent to the party using the shipper on which date a seasonal switch should be made from the winter configuration to the summer configuration or vice versa. This is at least for the reason that, in any given year, winter weather (or summer weather) may terminate earlier or later than in other years. As a result, the party using the shipper is simply left to make a guess as to when a seasonal switch should be made.

Moreover, even within the middle of a winter season or a summer season, there may be periods of unseasonable temperatures (i.e., cold periods in summer or warm periods in winter). Consequently, on any given day, a winter configuration or a summer configuration may be unsuitable for the ambient temperatures to which a shipment will actually be exposed. In addition, the sending party and the receiving party may reside in locations that experience vastly different ambient temperatures, thereby making a seasonal configuration that is suitable for one location unsuitable for another location. Furthermore, the route that is traveled by the shipper from the sending party to the receiving party may expose the shipper to ambient temperatures that may be significantly different from those experienced at one or both of the shipping origin and the shipping destination. As a result, a winter configuration or a summer configuration may actually be unsuitable for much of the time that a shipper is in transit between the shipping origin and the shipping destination.

In addition to the foregoing disadvantages, the present inventors have also discovered that, for ambient temperatures that are moderate (i.e., intermediate to both hot temperatures and cold temperatures), the protection afforded by either a winter configuration or a summer configuration is often less than optimal.

Therefore, to address one or more of the above-noted issues, the present invention provides, according to one embodiment, a method and system for customized configuration of a shipper for transporting temperature-sensitive materials, said method and system customizing the configuration of the shipper based on the particular ambient temperatures to which the shipper is expected to be exposed while the shipper is in transit from its shipping origin to its shipping destination. For example, according to one embodiment, the invention utilizes a webpage application that allows a user to input certain information. Such information may include information about the location of the shipping origin (e.g., the shipping origin zip code), information about the location of the shipping destination (e.g., the shipping destination zip code), information about the shipping method (e.g., FedEx, UPS, or ground courier), information about the desired temperature range at which the materials are to be maintained (e.g., room temperature vs. refrigerated (e.g., +2° C. to +8° C.)), and information about the maximum payload size desired (e.g., 2-liter, 3-liter, 8-liter, and 15-liter). Based on the inputted information and a selection methodology, a shipper is then selected from among a pre-selected collection of possible shipper configurations. Such a collection may include, for example, a hot configuration, a cold configuration, and a moderate configuration.

Customized Shipper Configuration Selection System 11

Referring now to FIG. 1, there is shown a simplified schematic representation of one embodiment of a system for customized configuration of a shipper for transporting temperature-sensitive materials, the system being constructed according to the teachings of the present invention and identified generally by reference numeral 11. Certain aspects of system 11 that are not critical to an understanding of the invention may be omitted from FIG. 1 or may be shown therein in a simplified manner.

As can be seen, system 11 may comprise a shipper (i.e., thermal shipping solution) selector/determiner 13. Shipper selector/determiner 13 may be in electronic communication with a plurality of shipping parties (or "customers") 15-1 through 15-n, a plurality of weather services 17-1 and 17-2, and a plurality of couriers 18-1 through 18-n. As will be discussed further below, shipper selector/determiner 13 may be used to select a suitable shipper configuration from amongst a plurality of possible shipper configurations based on the following: information inputted by a shipping party 15-1 through 15-n; information acquired from weather services 17-1 and 17-2; information acquired from couriers 18-1 through 18-n, and a selection methodology detailed below.

Shipper selector/determiner 13 may include a central controller 19 and a data storage device 21. Central controller 19 and data storage device 21 may be in electronic communication with one another via a network path 23. It is to be understood that central controller 19 and data storage device 21 may be housed at a common facility or may be remotely connected (e.g., as part of a cloud-based data storage solution).

As can be appreciated, central controller 19 may serve as the central functional hub of system 11. In the present embodiment, central controller 19 is shown as a web server that readily allows for the exchange of data through one or more designated web pages. However, it is to be understood that central controller 19 could be in the form of any host computer that is programmed to communicate with other compute devices through a designated network (e.g., an intranet).

Data storage device, or database, 21 may be any device that is designed to store information relating to the selection of a suitable shipper. Solely by way of example, data storage device 21 may store information about various possible shipper configurations, as well as pack-out (i.e., assembly) instructions for the aforementioned shipper configurations. In addition, data storage device 21 may also store criteria or parameters that may be used in making a selection of a particular shipper configuration from amongst a plurality of possible shipper configurations.

Shipping parties 15-1 through 15-n may be entities that use shippers to transport one or more types of temperature-sensitive materials including, but not limited to, pharmaceuticals, biological materials, foods, beverages, and the like. As one non-limiting example, one or more of shipping parties 15-1 through 15-n may be pharmaceutical companies that use shippers to transport pharmaceuticals and/or other temperature-sensitive materials to hospitals, clinics, medical practices, research facilities, and the like. As another non-limiting example, one or more of shipping parties 15-1 through 15-n may be food and/or beverage manufacturers that use shippers to deliver foods, beverages and/or other temperature-sensitive materials to food retailers, restaurants, residences, and the like. As yet another non-limiting example, shipping parties 15-1 through 15-n may be research institutions that use shippers to deliver biological materials and/or other temperature sensitive materials to other research institutions, to medical professionals, or the like.

It should be understood that, although shipping parties 15-1 through 15-n are discussed above as referring to parties from which a payload is sent, shipping parties 15-1 through 15-n could also refer to parties to which a payload is sent (for example, where such a party orders a payload from a vendor and wishes to select certain shipping parameters). It should also be understood shipping parties 15-1 through 15-n may include any combination, permutation, or variation of the aforementioned groups.

As noted above, shipping parties 15-1 through 15-n may be in electronic communication with shipper selector/determiner 13. Such communication may be continuous but need not be continuous and, instead, may be intermittent, periodic, or on an as-needed basis. Preferably, system 11 is appropriately scaled to support any number of concurrent users (i.e., shipping parties 15-1 through 15-n) without departing from the spirit of the present invention. Shipping parties 15-1 through 15-n may be independently linked with central controller 19 using corresponding compute devices 25-1 through 25-n, respectively.

Each of compute devices 25-1 through 25-n may be any type of compute device that is adapted to interface with central controller 19 (e.g., through a designated web page or mobile application). Solely for purposes of example, compute devices 25-1 and 25-n are represented herein as desktop computers, and compute device 25-2 is represented herein as a smartphone. However, it is to be understood that compute devices 25-1, 25-2, and 25-n are not limited to the particular types of devices shown and that access to central controller 19 could alternatively be achieved by each shipping party 15-1 through 15-n using other types of compute devices that are known in the art, such as tablet computers or kiosk-type compute workstations (e.g., for use by multiple shipping parties 15 within a common facility). As can be appreciated, in view of the above, compute devices 25-1 through 25-n may be identical types of compute devices or may be different types of compute devices. Also, it is to be understood that, although each of compute devices 25-1, 25-2, and 25-n is depicted as a single type of compute device, each of compute devices 25-1, 25-2, and 25-n could comprise two or more compute devices used alternatively or in combination. In this manner, for example, shipping party 15-1 could, in some cases, use a desktop to interface with central controller 19 and could, in other cases, use a smartphone or laptop to interface with central controller 19.

Weather services 17-1 and 17-2 may be entities that make available, either for a fee or at no charge, weather-related information to other parties. Such information may include, for example, historical, current and/or forecasted temperatures at various locations. Solely by way of example, such locations may include the location associated with each zip code or postal code throughout the world, throughout the United States, or in some subset thereof. Weather services 17-1 and 17-2 may include compute devices 27-1 and 27-2, respectively, on which the aforementioned weather-related information is accessible. Compute devices 27-1 and 27-2 may be any type of compute device that is adapted to interface with central controller 19 (e.g., through a designated web page or mobile application) to permit access to the aforementioned weather-related data. Solely for purposes of example, compute devices 27-1 and 27-2 are represented herein as servers on which the above-described temperature-related data is stored; however, it is to be understood that compute devices 27-1 and 27-2 could comprise other types of devices or combinations of devices. Communication between each of compute devices 27-1 and 27-2 and central controller 19 may be continuous but need not be continuous and, instead, may be intermittent, periodic, or on an as-needed basis. Each of weather services 17-1 and 17-2 may be independently linked with central controller 19 using their corresponding compute devices 27-1 through 27-n, respectively.

Although two weather services 17-1 and 17-2 are provided in the present embodiment to enable weather data to be obtained from two independent sources, it is to be understood that such weather data could be obtained from a single source or could be obtained from more than two sources.

Couriers 18-1 through 18-n may be entities that provide transport/delivery services for others, typically for a fee, and that additionally provide information regarding their respective transport/delivery routes. Couriers 18-1 through 18-n may be independently linked with central controller 19 using corresponding compute devices 29-1 through 29-n, respectively. Each of compute devices 29-1 through 29-n may be any type of compute device that is adapted to interface with central controller 19 (e.g., through a designated web page or mobile application) to permit access to the aforementioned transport/delivery routes. Solely for purposes of example, compute devices 29-1 and 29-n are represented herein as servers; however, it is to be understood that compute devices 29-1 and 29-n could comprise other types of devices or combinations of devices. Communication between each of compute devices 29-1 through 29-n and central controller 19 may be continuous but need not be continuous and, instead, may be intermittent, periodic, or on an as-needed basis.

In another embodiment, couriers 18-1 through 18-n could be eliminated, and the transport/delivery routes stored on compute devices 29-1 through 29-n could instead be stored on data storage device 21. However, one advantage to the embodiment shown in FIG. 1 is that alterations or updates to the transport/delivery routes may be communicated to and/or retrieved by central controller 19. This reduces the possibility that shipper selector/determiner 13 may base a decision on outdated information.

Method for Customized Configuration of Shipper Using System 11

As referenced above, system 11 enables a user to identify a shipper, from amongst a wide variety of preselected customized configurations, that is best suited for transporting a temperature-sensitive payload from a desired origin to a desired destination.

Figure 2:
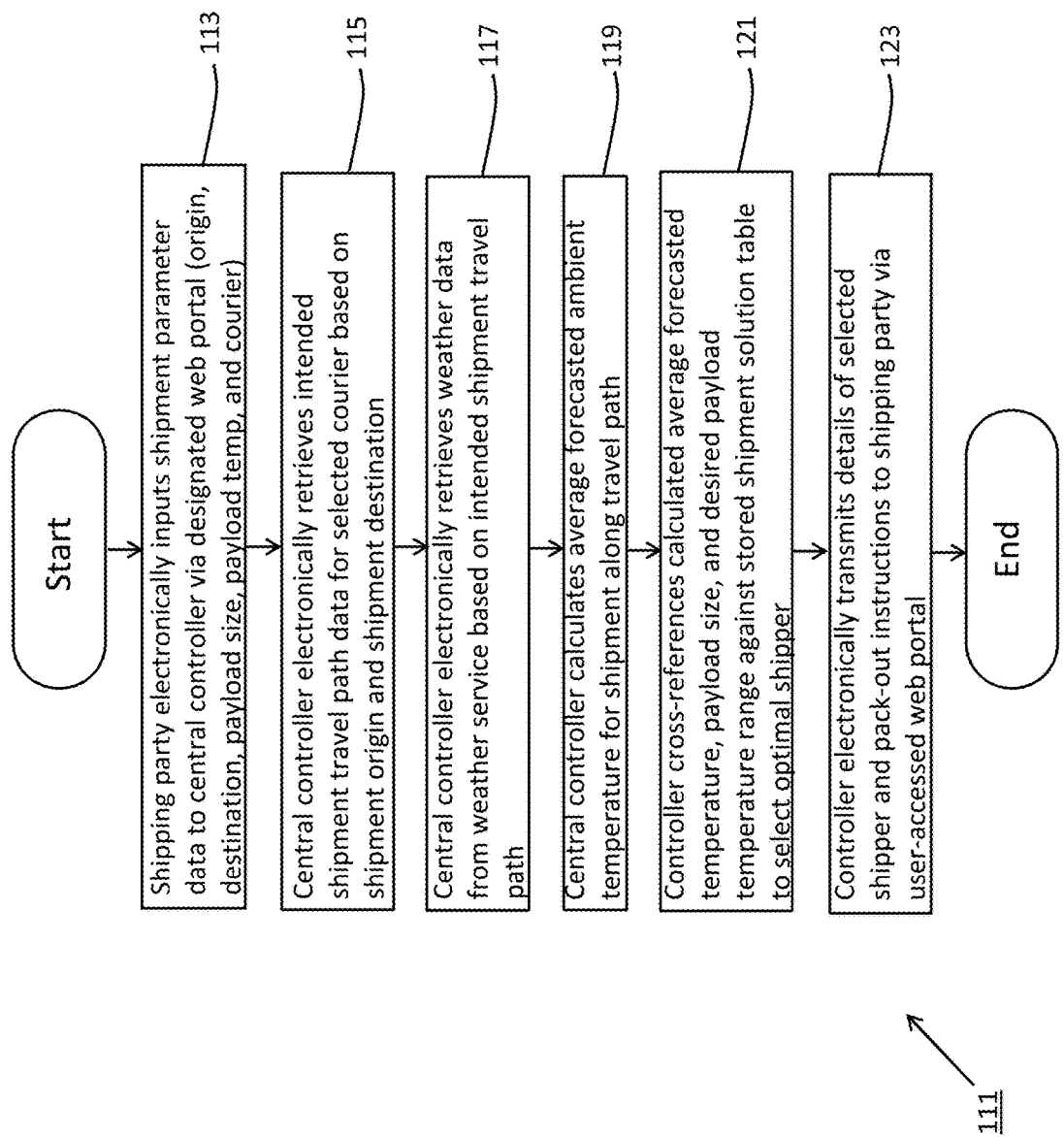
FIG. 2 is a flowchart depicting a method by which a party may use the system of FIG. 1 to select a suitable shipper for a particular application.

Referring now to FIG. 2, there is shown a flowchart depicting an illustrative method by which system 11 may be used to select a customized configuration of a shipper that is well-suited for transporting temperature-sensitive materials, the method being identified generally by reference numeral 111.

Specifically, method 111 may comprise a step 113, in which a shipping party 15 may electronically input to central controller 19, using a designated web portal, various shipment parameter data. The aforementioned shipment parameter data may include, for example, a shipping origin location, a shipping destination location, a desired mode of transport/delivery, a desired temperature range at which the payload is to be kept, and a desired payload size.

According to one embodiment, the above-noted shipping origin location may be a postal code, such as, but not limited to, a US zip code. In addition, the above-noted shipping destination location may be a postal code, such as, but not limited to, a US zip code.

According to another embodiment, the above-noted desired mode of transport/delivery may be selected from a list of available air and/or ground couriers. Examples of such couriers may include, but are not limited to, FedEx, UPS, or ground transport.

According to another embodiment, the above-noted desired temperature range may be identified, for example, by selecting a particular temperature range from a list of available temperature ranges. Examples of such temperature ranges may include, but are not limited to, refrigerated (e.g., +2° C. to +8° C.) and room temperature (e.g., +15° C. to +25° C.).

According to another embodiment, the above-noted desired payload size may be identified, for example, by selecting a particular payload size from a list of available payload sizes. Examples of such payload sizes may include, but are not limited to, 2-liters, 3-liters, 8-liters, and 15-liters.

Method 111 may further comprise a step 115, in which central controller 19 may electronically retrieve, for example, from couriers 18-1 through 18-n, intended shipment travel path data based on the inputted shipping origin location, the inputted shipping destination location, and the inputted mode of transport/delivery. According to one embodiment, UPS is amongst the available modes of transport/delivery for the shipment. For such an embodiment, if UPS is selected as the desired mode of transport/delivery and if the distance between the shipping origin location and the shipping destination location is more than 200 miles, the intended travel path is regarded as an air route; otherwise, if UPS is selected and the distance between the shipping origin location and the shipping destination location is 200 miles or fewer, the shipment is assumed to be by ground transportation (e.g., truck).

Method 111 may further comprise a step 117, in which central controller 19 may electronically retrieve, for example, from weather services 17-1 and/or 17-2, ambient temperature data for the intended shipment travel path. Such ambient temperature data may comprise, for example, current and/or forecasted ambient temperatures for the shipment at various times along the intended shipment travel path. According to one embodiment, such temperature data may consist of or comprise the forecasted ambient temperature of the shipment at regular intervals of time for the intended travel path. For example, the temperature data may be the forecasted ambient temperature of the shipment at one-hour intervals along the intended travel path until the estimated delivery of the shipper (typically by 10 am the following day).

Method 111 may further comprise a step 119, in which central controller 19 may calculate an average forecasted ambient temperature for the shipment along the intended travel path. Such an average may be calculated, for example, by averaging the forecasted ambient temperatures at one-hour intervals along the intended travel path. According to one embodiment, where the shipment is isolated from ambient temperatures for a portion of the intended travel path by virtue of being in a confined shipping system like a plane or sort facilities, a nominal temperature may be assigned for that portion of the intended travel path.

Method 111 may further comprise a step 121, in which central controller 19 may cross-reference the calculated average forecasted ambient temperature and other shipment parameters (e.g., payload size and desired payload temperature range) against a stored shipper solution table to select an optimal shipper. According to one embodiment, such a shipper solution table provides three possible types of configurations for each combination of payload size and temperature range. For example, the three possible configurations for each payload size/temperature range combination may be a cold temperature configuration, a hot temperature configuration, and a moderate temperature configuration. The cold temperature configuration may be selected where the average forecasted ambient temperature is below a lower limit, the hot temperature configuration may be selected where the average forecasted ambient temperature is above an upper limit, and the moderate temperature configuration may be selected where the average forecasted ambient temperature is at least as high as the lower limit and no greater than the upper limit.

According to one embodiment, if the selected mode of transport/delivery is by ground transportation or is by UPS where the distance between the shipping origin and the shipping destination is no more than 200 miles, method 111 does not require an average forecasted ambient temperature to be calculated or compared as the moderate temperature configuration is automatically selected. The use of the moderate temperature configuration in these cases is due to the fact that such transportation typically employs vans and trucks that are temperature-controlled and that are typically set near a room temperature of 20° C. As a result, the average ambient temperature in these cases is 20° C. for the duration of the shipment, and the moderate temperature configuration is best suited for such ambient conditions.

Method 111 may further comprise a step 123, in which central controller 19 may electronically transmit details of a selected shipper and pack-out instructions to the shipping party 15 via a user-accessed web portal.

Figure 3:
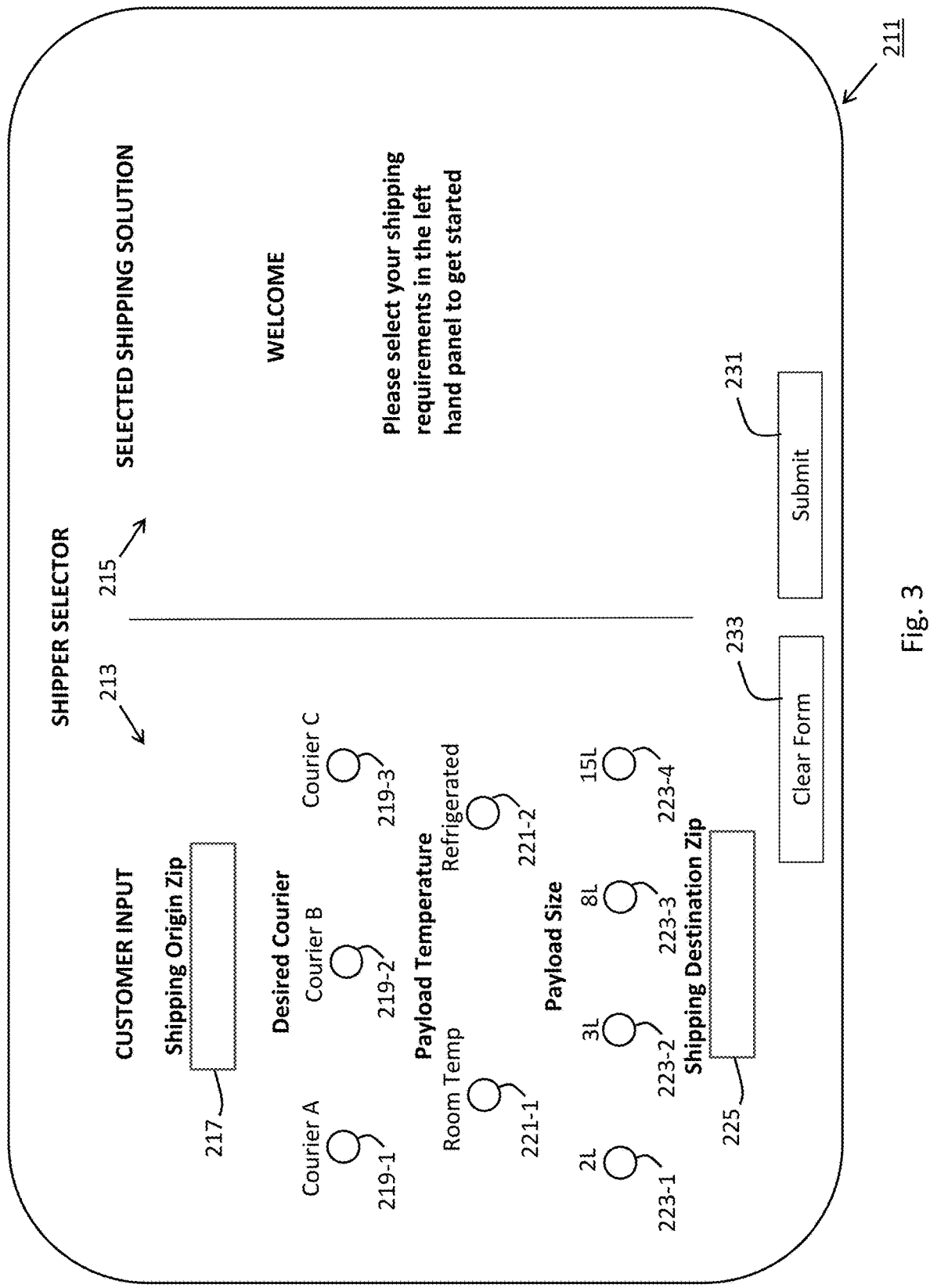
FIG. 3 is an illustration of one embodiment of a graphical user interface suitable for use in the system of FIG. 1, the graphical user interface being shown prior to the inputting of any data by a shipping party.

Referring now to FIG. 3, there is shown a sample screen display of an exemplary embodiment of a front-end graphical user interface (GUI) that may be utilized by a shipping party 15 to input various shipment parameter data to shipper selector/determiner 13 and to receive a recommendation from shipper selector/determiner 13 of a suitable shipper configuration, the screen display being represented generally by reference numeral 211.

Screen display 211 may comprise an input panel 213 and an output panel 215. Input panel 213 may comprise a number of input controls. For example, input panel 213 may comprise a first input control in the form of a shipping origin text field or window 217, in which a user may enter a zip code corresponding to the location of the shipment origin. Input panel 213 may further comprise a second input control in the form of one or more radio buttons by which a user may select a desired courier from one or more courier options. In the present embodiment, three radio buttons are provided, by which a user may select from among a Courier A radio button 219-1, a Courier B radio button 219-2, and a Courier C radio button 219-3. Radio buttons 219-1 through 219-3 may correspond, for example, to FedEx, UPS, and ground transport, respectively. Input panel 213 may further comprise a third input control in the form of one or more radio buttons by which a user may select a desired payload temperature or temperature range from one or more temperature options. In the present embodiment, two temperature radio buttons are provided, by which a user may select from among a Room Temperature radio button 221-1 and a Refrigerated radio button 221-2. Room Temperature radio button 221-1 may correspond, for example, to a desired payload temperature range of +15° C. to +25° C., and Refrigerated radio button 221-2 may correspond, for example, to a desired payload temperature range of +2° C. to +8° C. Input panel 213 may further comprise a fourth input control in the form of one or more radio buttons by which a user may select a desired payload size from one or more options. In the present embodiment, four payload size radio buttons are provided, by which a user may select from among a 2L radio button 223-1, a 3L radio button 223-2, an 8L radio button 223-3, and a 15L radio button 223-4. Input panel 213 may further comprise a fifth input control in the form of a shipping origin text field or window 225, in which a user may enter a zip code corresponding to the location of the shipment origin.

Output panel 215 includes a space in which information about the selected shipper may be displayed after the input data has been entered using input panel 213 and after a submit button 231 has been selected. The displayed information may include, for example, one or more of the following: (i) the name of the selected shipper, (ii) an illustration of the selected shipper and a listing of some or all components of the selected shipper, (iii) instructions regarding the preconditioning of phase-change materials for the selected shipper; and (iv) an identification (e.g., city and state) of the shipping origin and the shipping destination.

Screen display 211 may further comprise a Clear Form button 233 to clear input panel 213 and output panel 215, for example, after a recommended shipper has been displayed, thereby permitting a new set of data to be entered.

As noted above, screen display 211 is merely illustrative. Accordingly, additions, deletions and other modifications to screen display 211 may be made without departing from the present invention.

Figure 4A:
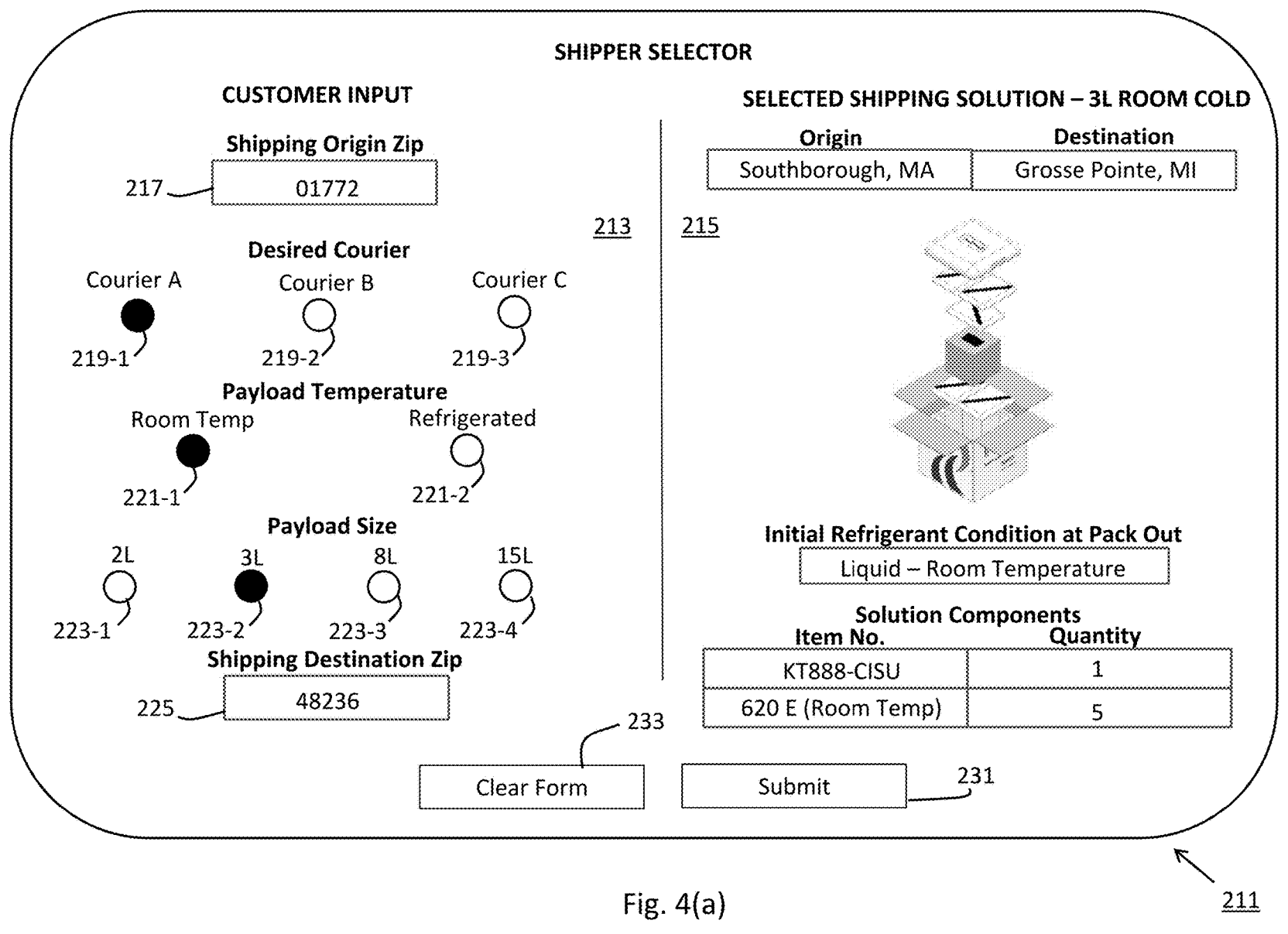
Figure 4B:
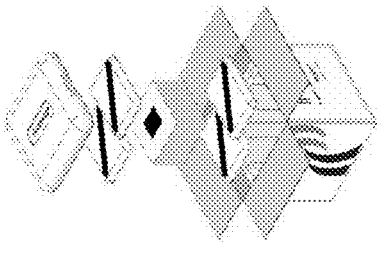

Referring now to FIGS. 4(a) and 4(b), screen display 211 is shown for two slightly different sets of inputted data. In both sets of inputted data, the user inputted a zip code of 01772 (corresponding to Southborough, MA) in shipping origin zip window 217, inputted a zip code of 48236 (corresponding to Grosse Pointe, MI) in shipping destination zip window 225, selected the Room Temperature radio button 221-1 for the desired temperature range, and selected the 3L radio button 223-2 for the desired payload size. However, in FIG. 4(a), the user selected the Courier A radio button 219-1 (e.g., FedEx) for the desired courier whereas, in FIG. 4(b), the user selected the Courier C radio button 219-3 (e.g., ground transport) for the desired courier. As can be seen, based on this difference in courier, in FIG. 4(a), the shipper shown in output panel 215 is the 3L Room Cold configuration whereas, in FIG. 4(b), the shipper shown in output panel 215 is the 3L Room Moderate configuration.

As noted above, according to one embodiment, if the desired courier is ground transportation (as, for example, in the scenario illustrated in FIG. 4(b)), shipper selector/determiner 13 may be configured to select a moderate configuration in all cases. In other cases, the shipper selector/determiner 13 may compare an average temperature along the entire travel path to appropriate standards. Referring now to FIG. 5, there is shown a table 311 that includes such standards, which may be used to determine, in a given case, whether a hot configuration, a cold configuration or a moderate configuration should be used. For example, as illustrated by row 313 of table 311, for a 2L shipper, if the payload is to be maintained within a refrigerated temperature range (e.g., +2° C. to +8° C.), then, for a calculated average ambient temperature below 10° C., a cold configuration would be selected, for a calculated average ambient temperature from 10° ° C. to 18° C., a moderate configuration would be selected, and for a calculated average ambient temperature above 18° C., a hot configuration would be selected. Alternatively, if the payload is to be maintained within a room temperature range (e.g., +15° C. to)+25° ° C., then, for a calculated average ambient temperature below 16° C., a cold configuration would be selected, for a calculated average ambient temperature from 16° C. to 24° C., a moderate configuration would be selected, and for a calculated average ambient temperature above 24° C., a hot configuration would be selected. The table of FIG. 5 also shows analogous standards to be applied for 3L shippers, 8L shippers, and 15L shippers, both where the payload is to be maintained within a refrigerated temperature range and at room temperature.

Figures 6A, 6B, 6C:
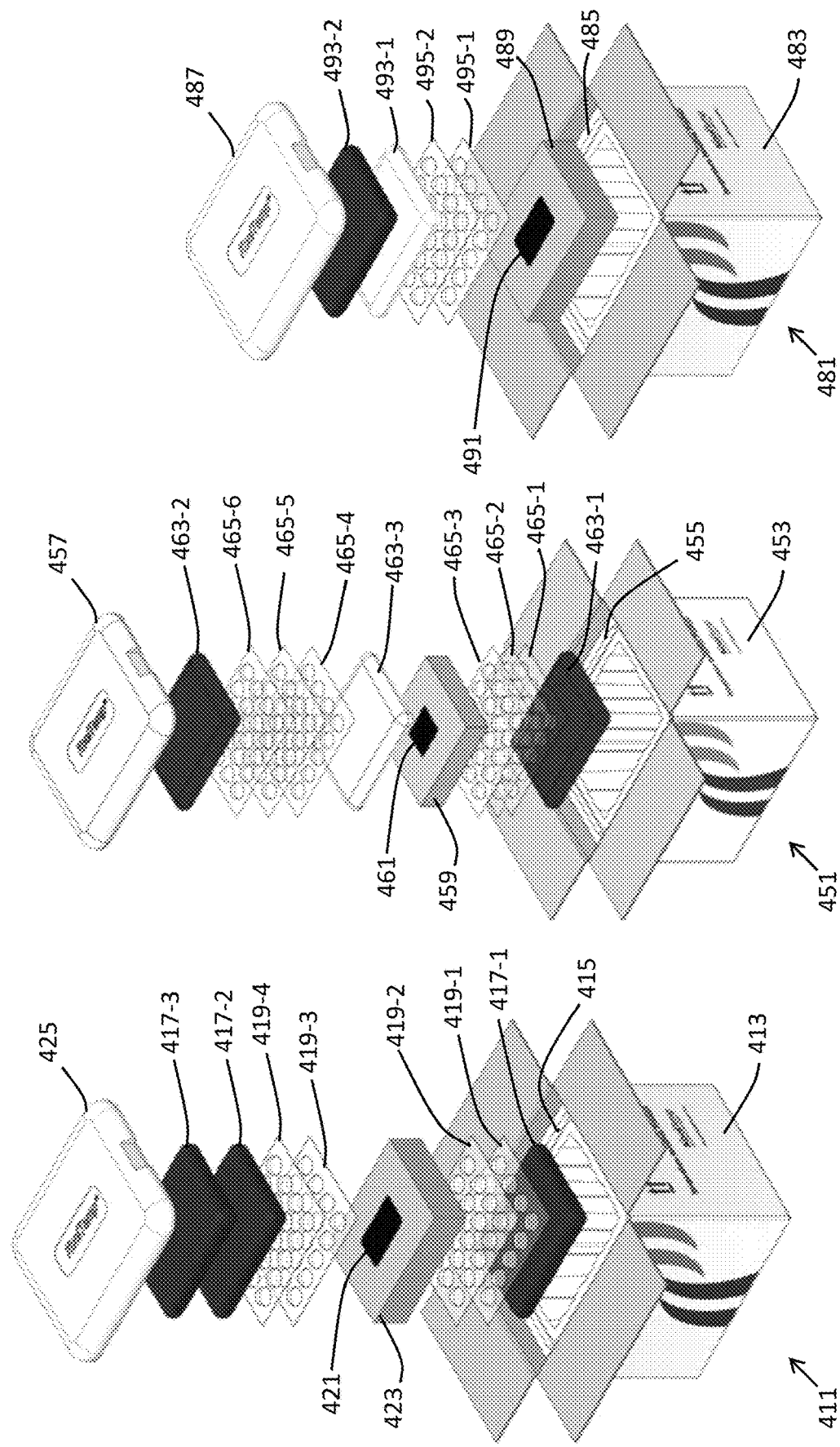
FIGS. 6(a) through 6(c) are exploded perspective views of alternative shipper configurations of a 2-liter shipper designed to maintain a payload in a refrigerated condition.

Referring now to FIGS. 6(a)-6(c), 7(a)-7(c), 8(a)-8(c), 9(a)-9(c), 10(a)-10(c), 11(a)-11(c), 12(a)-12(c), and 13(a)-13(c), there are shown exploded perspective views of various alternative shipper configurations from which a desired shipper may be selected, for example, using the above-described method and system and, particularly, using the types of inputted information sought using screen display 211. More specifically, referring to FIGS. 6(a)-6(c), there are shown hot, moderate, and cold configurations, respectively, for a 2L shipper (Model No. KT867) designed for maintaining a payload within a refrigerated temperature range (e.g., +2° C. to +8° C.) for an extended period of time. FIG. 6(a) shows a hot configuration 411, which is particularly well suited for ambient temperatures above a certain threshold. Hot configuration 411 may comprise an outer box 413, which may be made of, for example, corrugated cardboard, an insulated base 415, which may be made of, for example, expanded polystyrene and which may be appropriately dimensioned to hold up to a 2L payload, a plurality of phase-change elements 417-1 through 417-3, which may be, for example, identical water-based gel packs preconditioned to a frozen/solid state at −5° C. to 0° C., a plurality of bubble wrap sheets 419-1 through 419-4, a temperature indicator 421, a payload container 423, which may be made of, for example, corrugated cardboard, and an insulated lid 425, which may mate with and be made of the same material as insulated base 415. (In some cases, payload container 423 may be omitted, with the payload not being contained within a separate payload container. Also, in some cases, temperature indicator 421 may be omitted.)

In use, insulated base 415 may be placed inside of outer box 413, and phase-change element 417-1 may be placed within insulated base 415 on top of its inner bottom wall. Then, bubble wrap sheets 419-1 and 419-2 may be placed on top of phase-change element 417-1. Then, the payload container 423 with payload (or the payload alone) may be centered within insulated base 415 and placed on top of bubble wrap sheets 419-1 and 419-2. Then, the temperature indicator 421 may be placed directly on top of the payload container 423 (or directly on top of the payload). Then, bubble wrap sheets 419-3 and 419-4 may be placed on top of temperature indicator 421. Then, phase-change elements 417-2 and 417-3 may be placed on top of bubble wrap sheets 419-3 and 419-4. Then, additional bubble wrap may be used to fill all void spaces. Then, the insulated lid 425 may be placed on top of insulated base 415, and the outer box 413 may be closed and taped shut.

FIG. 6(b) shows the moderate configuration 451, which is particularly well-suited for ambient temperatures within a predetermined intermediate range. Moderate configuration 451 may be similar in some respects to hot configuration 411. Accordingly, moderate configuration 451 may include an outer box 453, which may be identical to outer box 413, an insulated base 455, which may be identical to insulated base 415, an insulated lid 457, which may be identical to insulated lid 425, a payload container 459, which may be identical to payload container 423, and a temperature indicator 461, which may be identical to temperature indicator 421. (As is the case with hot configuration 411, payload container 459 of moderate configuration 451 may be omitted.) Moderate configuration 451 may differ from hot configuration 411 in at least the following respects: First, whereas hot configuration 411 may include three phase-change elements 417-1 through 417-3, moderate configuration 451 may include three phase-change elements 463-1 through 463-3. Phase-change elements 463-1 through 463-3, like phase-change elements 417-1 through 417-3, may be water-based gel packs; however, whereas, in hot configuration 411, all three of phase-change elements 417-1 through 417-3 may be preconditioned at −5° C. to 0° ° C. to a frozen/solid state, in moderate configuration 451, phase-change elements 463-1 and 463-2 may be preconditioned at −5° C. to 0° C. to a frozen/solid state, and phase-change element 463-3 may be preconditioned at +5° C. to a refrigerated liquid state. Second, whereas hot configuration 411 may include four bubble wrap sheets 419-1 through 419-4, moderate configuration 451 may include six bubble wrap sheets 465-1 through 465-6, with bubble wrap sheets 465-1 through 465-3 being disposed between phase-change element 463-1 and the payload and with bubble wrap sheets 465-4 through 465-6 being disposed between phase-change elements 463-2 and 463-3. Moderate configuration 451 may be assembled in a fashion analogous to that described above for hot configuration 411.

FIG. 6(c) shows the cold configuration 481, which is particularly well-suited for ambient temperatures below a predetermined threshold. Cold configuration 481 may be similar in some respects to hot configuration 411. Accordingly, cold configuration 481 may include an outer box 483, which may be identical to outer box 413, an insulated base 485, which may be identical to insulated base 415, an insulated lid 487, which may be identical to insulated lid 425, a payload container 489, which may be identical to payload container 423, and a temperature indicator 491, which may be identical to temperature indicator 421. (As is the case with hot configuration 411, payload container 489 of cold configuration 481 may be omitted.) Cold configuration 481 may differ from hot configuration 411 in at least the following respects: First, whereas hot configuration 411 may include three phase-change elements 417-1 through 417-3, cold configuration 481 may include two phase-change elements 493-1 and 493-2. Phase-change elements 493-1 and 493-2, like phase-change elements 417-1 through 417-3, may be water-based gel packs; however, whereas, in hot configuration 411, all three of phase-change elements 417-1 through 417-3 may be preconditioned to a frozen/solid state, in cold configuration 481, phase-change element 493-1 may be preconditioned at +5° C. to a refrigerated liquid state, and phase-change element 493-2 may be preconditioned at −5° C. to 0° C. to a frozen/solid state. Second, whereas hot configuration 411 may include four bubble wrap sheets 419-1 through 419-4, cold configuration 481 may include two bubble wrap sheets 495-1 and 495-2, with bubble wrap sheets 495-1 and 495-2 being disposed between phase-change element 493-1 and the payload. Cold configuration 481 may be assembled in a fashion analogous to that described above for hot configuration 411.

Figures 7A, 7B, 7C:
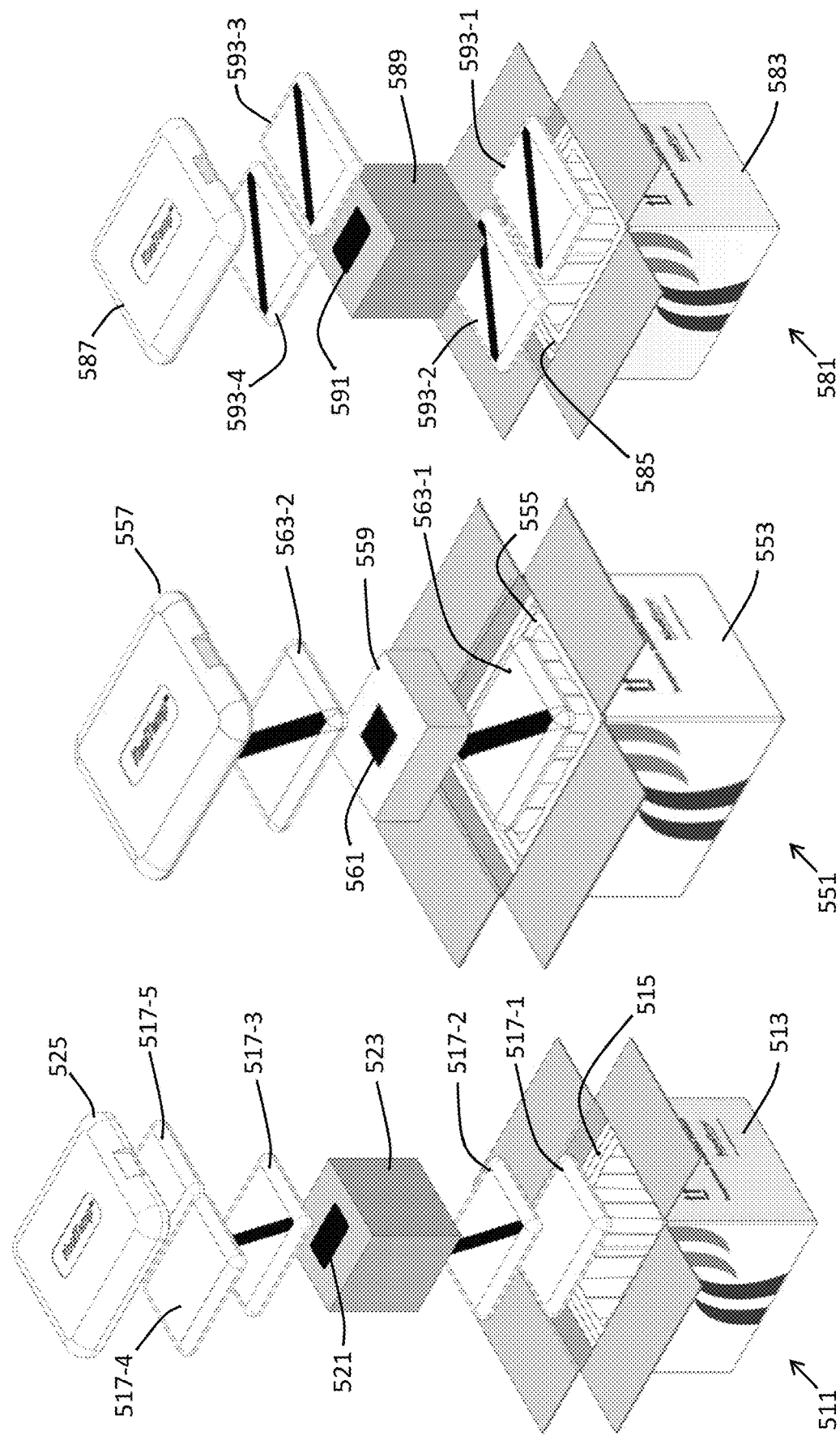
FIGS. 7(a) through 7(c) are exploded perspective views of alternative shipper configurations of a 2-liter shipper designed to maintain a payload at room temperature.

Referring now to FIGS. 7(a)-7(c), there are shown hot, moderate, and cold configurations, respectively, for a 2L shipper (Model No. KT867) designed for maintaining a payload within a room temperature range (e.g., +15° C. to +25° C.) for an extended period of time. FIG. 7(a) shows the hot configuration 511. Hot configuration 511 may comprise an outer box 513, which may be made of, for example, corrugated cardboard, an insulated base 515, which may be made of, for example, expanded polystyrene and which may be appropriately dimensioned to hold up to a 2L payload, a plurality of phase-change elements 517-1 through 517-5, which may be, for example, identical water-based gel packs (with phase-change elements 517-1, 517-4, and 517-5 being preconditioned to a refrigerated liquid state at +5° C. and with phase-change elements 517-2 and 517-3 being preconditioned to a liquid state at room temperature), a temperature indicator 521, a payload container 523, which may be made of, for example, corrugated cardboard, and an insulated lid 525, which may mate with and be made of the same material as insulated base 515. (In some cases, payload container 523 may be omitted, with the payload not being contained within a separate payload container. Also, in some cases, temperature indicator 521 may be omitted.)

In use, insulated base 515 may be placed inside of outer box 513, and phase-change element 517-1 may be placed within insulated base 515 on top of its inner bottom wall. Then, phase-change element 517-2 may be placed on top of phase-change element 517-1. Then, the payload container 523 with payload (or the payload alone) may be centered within insulated base 515 and placed on top of phase-change element 517-2. Then, the temperature indicator 521 may be placed directly on top of the payload container 523 (or directly on top of the payload). Then, phase-change element 517-3 may be placed on top of temperature indicator 521. Then, phase-change elements 517-4 and 517-5 may be placed on top of phase-change element 517-3. Then, bubble wrap may be used to fill all void spaces. Then, the insulated lid 525 may be placed on top of insulated base 515, and the outer box 513 may be closed and taped shut.

FIG. 7(b) shows the moderate configuration 551. Moderate configuration 551 may be similar in some respects to hot configuration 511. Accordingly, moderate configuration 551 may include an outer box 553, which may be identical to outer box 513, an insulated base 555, which may be identical to insulated base 515, an insulated lid 557, which may be identical to insulated lid 525, a payload container 559, which may be identical to payload container 523, and a temperature indicator 561, which may be identical to temperature indicator 521. (As is the case with hot configuration 511, payload container 559 of moderate configuration 551 may be omitted.) Moderate configuration 551 may differ from hot configuration 511 in at least the following respects: Whereas hot configuration 511 may include five phase-change elements 517-1 through 517-5, moderate configuration 551 may include two phase-change elements 563-1 and 563-2. Phase-change elements 563-1 and 563-2, like phase-change elements 517-1 through 517-5, may be water-based gel packs; however, whereas, in hot configuration 511, phase-change elements 517-1, 517-4 and 517-5 may be preconditioned at +5° C. to a refrigerated liquid state and phase-change element 517-2 and 517-3 may be preconditioned at room temperature to a room temperature liquid state, in moderate configuration 551, phase-change elements 563-1 and 563-2 may be preconditioned at room temperature to a room temperature liquid state. Moderate configuration 551 may be assembled in a fashion analogous to that described above for hot configuration 511.

FIG. 7(c) shows the cold configuration 581. Cold configuration 581 may be similar in some respects to hot configuration 511. Accordingly, cold configuration 581 may include an outer box 583, which may be identical to outer box 513, an insulated base 585, which may be identical to insulated base 515, an insulated lid 587, which may be identical to insulated lid 525, a payload container 589, which may be identical to payload container 523, and a temperature indicator 591, which may be identical to temperature indicator 521. (As is the case with hot configuration 511, payload container 589 of cold configuration 581 may be omitted.) Cold configuration 581 may differ from hot configuration 511 in at least the following respects: Whereas hot configuration 511 may include five phase-change elements 517-1 through 517-5, cold configuration 581 may include four phase-change elements 593-1 through 593-4. Phase-change elements 593-1 through 593-4, like phase-change elements 517-1 through 517-5, may be water-based gel packs; however, whereas, in hot configuration 511, phase-change elements 517-1, 517-4 and 517-5 may be preconditioned at +5° C. to a refrigerated liquid state and phase-change elements 517-2 and 517-3 may be preconditioned at room temperature to a room temperature liquid state, in cold configuration 581, phase-change elements 593-1 through 593-4 may be preconditioned at room temperature to a room temperature liquid state. Cold configuration 581 may be assembled in a fashion analogous to that described above for hot configuration 511.

Figures 8A, 8B, 8C:
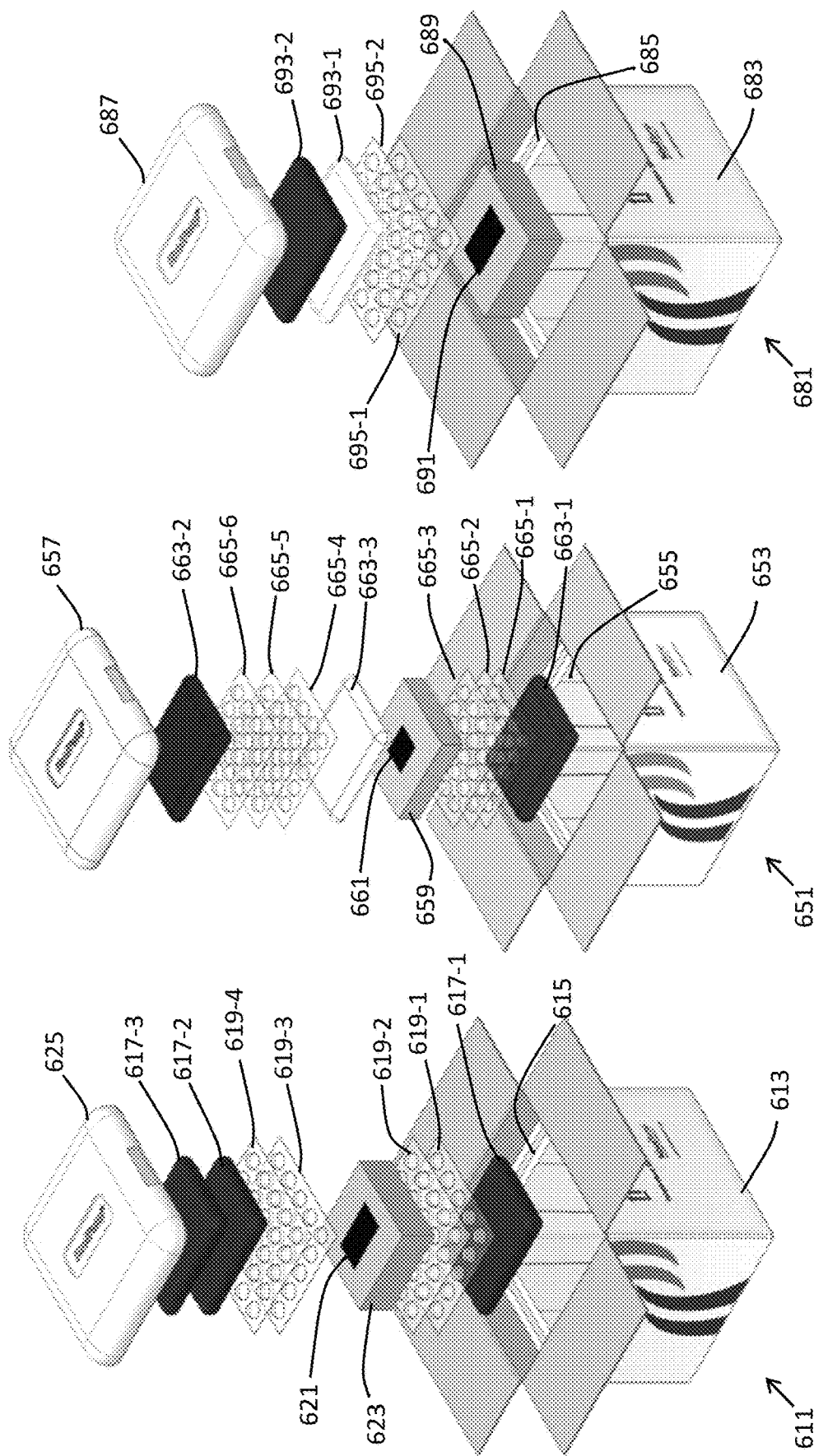
FIGS. 8(a) through 8(c) are exploded perspective views of alternative shipper configurations of a 3-liter shipper designed to maintain a payload in a refrigerated condition.

Referring to FIGS. 8(a)-8(c), there are shown hot, moderate, and cold configurations, respectively, for a 3L shipper (Model No. KT888) designed for maintaining a payload within a refrigerated temperature range (e.g., +2° C. to +8° C.) for an extended period of time. FIG. 8(a) shows a hot configuration 611. Hot configuration 611 may comprise an outer box 613, which may be made of, for example, corrugated cardboard, an insulated base 615, which may be made of, for example, expanded polystyrene and which may be appropriately dimensioned to hold up to a 3L payload, a plurality of phase-change elements 617-1 through 617-3, which may be, for example, identical water-based gel packs preconditioned to a frozen/solid state at −5° C. to 0° C., a plurality of bubble wrap sheets 619-1 through 619-4, a temperature indicator 621, a payload container 623, which may be made of, for example, corrugated cardboard, and an insulated lid 625, which may mate with and be made of the same material as insulated base 615. (In some cases, payload container 623 may be omitted, with the payload not being contained within a separate payload container. Also, in some cases, temperature indicator 621 may be omitted.)

In use, insulated base 615 may be placed inside of outer box 613, and phase-change element 617-1 may be placed within insulated base 615 on top of its inner bottom wall. Then, bubble wrap sheets 619-1 and 619-2 may be placed on top of phase-change element 617-1. Then, the payload container 623 with payload (or the payload alone) may be centered within insulated base 615 and placed on top of bubble wrap sheets 619-1 and 619-2. Then, the temperature indicator 621 may be placed directly on top of the payload container 623 (or directly on top of the payload). Then, bubble wrap sheets 619-3 and 619-4 may be placed on top of temperature indicator 621. Then, phase-change elements 617-2 and 617-3 may be placed on top of bubble wrap sheets 619-3 and 619-4. (Preferably, phase-change elements 617-2 and 617-3 are spread apart from one another so that they abut the inner side walls of base 615.) Then, additional bubble wrap may be used to fill all void spaces. Then, the insulated lid 625 may be placed on top of insulated base 615, and the outer box 613 may be closed and taped shut.

FIG. 8(b) shows the moderate configuration 651. Moderate configuration 651 may be similar in some respects to hot configuration 611. Accordingly, moderate configuration 651 may include an outer box 653, which may be identical to outer box 613, an insulated base 655, which may be identical to insulated base 615, an insulated lid 657, which may be identical to insulated lid 625, a payload container 659, which may be identical to payload container 623, and a temperature indicator 661, which may be identical to temperature indicator 621. (As is the case with hot configuration 611, payload container 659 of moderate configuration 651 may be omitted.) Moderate configuration 651 may differ from hot configuration 611 in at least the following respects: First, whereas hot configuration 611 may include three phase-change elements 617-1 through 617-3, moderate configuration 651 may include three phase-change elements 663-1 through 663-3. Phase-change elements 663-1 through 663-3, like phase-change elements 617-1 through 617-3, may be water-based gel packs; however, whereas, in hot configuration 611, all three of phase-change elements 617-1 through 617-3 may be preconditioned at −5° C. to 0° C. to a frozen/solid state, in moderate configuration 651, phase-change elements 663-1 and 663-2 may be preconditioned at −5° C. to 0° C. to a frozen/solid state, and phase-change element 663-3 may be preconditioned at +5° C. to a refrigerated liquid state. Second, whereas hot configuration 611 may include four bubble wrap sheets 619-1 through 619-4, moderate configuration 651 may include six bubble wrap sheets 665-1 through 665-6, with bubble wrap sheets 665-1 through 665-3 being disposed between phase-change element 663-1 and the payload and with bubble wrap sheets 665-4 through 665-6 being disposed between phase-change elements 663-2 and 663-3. Moderate configuration 651 may be assembled in a fashion analogous to that described above for hot configuration 611.

FIG. 8(c) shows the cold configuration 681. Cold configuration 681 may be similar in some respects to hot configuration 611. Accordingly, cold configuration 681 may include an outer box 683, which may be identical to outer box 613, an insulated base 685, which may be identical to insulated base 615, an insulated lid 687, which may be identical to insulated lid 625, a payload container 689, which may be identical to payload container 623, and a temperature indicator 691, which may be identical to temperature indicator 621. (As is the case with hot configuration 611, payload container 689 of cold configuration 681 may be omitted.) Cold configuration 681 may differ from hot configuration 611 in at least the following respects: First, whereas hot configuration 611 may include three phase-change elements 617-1 through 617-3, cold configuration 681 may include two phase-change elements 693-1 and 693-2. Phase-change elements 693-1 and 693-2, like phase-change elements 617-1 through 617-3, may be water-based gel packs; however, whereas, in hot configuration 611, all three of phase-change elements 617-1 through 617-3 may be preconditioned to a frozen/solid state, in cold configuration 681, phase-change element 693-1 may be preconditioned at +5° C. to a refrigerated liquid state, and phase-change element 693-2 may be preconditioned at −5° C. to 0° ° C. to a frozen/solid state. Second, whereas hot configuration 611 may include four bubble wrap sheets 619-1 through 619-4, cold configuration 681 may include two bubble wrap sheets 695-1 and 695-2, with bubble wrap sheets 695-1 and 695-2 being disposed between phase-change element 693-1 and the payload. Cold configuration 681 may be assembled in a fashion analogous to that described above for hot configuration 611.

Referring now to FIGS. 9(a)-9(c), there are shown hot, moderate, and cold configurations, respectively, for a 3L shipper (Model No. KT888) designed for maintaining a payload within a room temperature range (e.g., +15° C. to +25° C.) for an extended period of time. FIG. 9(a) shows the hot configuration 711. Hot configuration 711 may comprise an outer box 713, which may be made of, for example, corrugated cardboard, an insulated base 715, which may be made of, for example, expanded polystyrene and which may be appropriately dimensioned to hold up to a 3L payload, a plurality of phase-change elements 717-1 through 717-6, which may be, for example, identical water-based gel packs (with phase-change elements 717-1, 717-5, and 717-6 being preconditioned to a refrigerated liquid state at +5° C. and with phase-change elements 717-2, 717-3 and 717-4 being preconditioned to a liquid state at room temperature), a temperature indicator 721, a payload container 723, which may be made of, for example, corrugated cardboard, and an insulated lid 725, which may mate with and be made of the same material as insulated base 715. (In some cases, payload container 723 may be omitted, with the payload not being contained within a separate payload container. Also, in some cases, temperature indicator 721 may be omitted.)

In use, insulated base 715 may be placed inside of outer box 713, and phase-change element 717-1 may be placed within insulated base 715 on top of its inner bottom wall. Then, phase-change element 717-2 may be placed on top of phase-change element 717-1. Then, the payload container 723 with payload (or the payload alone) may be centered within insulated base 715 and placed on top of phase-change element 717-2. Then, the temperature indicator 721 may be placed directly on top of the payload container 723 (or directly on top of the payload). Then, phase-change elements 717-3 and 717-4 may be placed on top of temperature indicator 721. Then, phase-change elements 717-5 and 717-6 may be placed on top of phase-change elements 717-3 and 717-4. Then, bubble wrap may be used to fill all void spaces. Then, the insulated lid 725 may be placed on top of insulated base 715, and the outer box 713 may be closed and taped shut.

FIG. 9(b) shows the moderate configuration 751. Moderate configuration 751 may be similar in some respects to hot configuration 711. Accordingly, moderate configuration 751 may include an outer box 753, which may be identical to outer box 713, an insulated base 755, which may be identical to insulated base 715, an insulated lid 757, which may be identical to insulated lid 725, a payload container 759, which may be identical to payload container 723, and a temperature indicator 761, which may be identical to temperature indicator 721. (As is the case with hot configuration 711, payload container 759 of moderate configuration 751 may be omitted.) Moderate configuration 751 may differ from hot configuration 711 in at least the following respects: Whereas hot configuration 711 may include six phase-change elements 717-1 through 717-6, moderate configuration 751 may include four phase-change elements 763-1 through 763-4. Phase-change elements 763-1 through 763-4, like phase-change elements 717-1 through 717-6 may be water-based gel packs; however, whereas, in hot configuration 711, phase-change elements 717-1, 717-5 and 717-6 may be preconditioned at +5° C. to a refrigerated liquid state and phase-change element 717-2, 717-3 and 717-4 may be preconditioned at room temperature to a room temperature liquid state, in moderate configuration 751, all of phase-change elements 763-1 through 763-4 may be preconditioned at room temperature to a room temperature liquid state. Moderate configuration 751 may be assembled in a fashion analogous to that described above for hot configuration 711.

FIG. 9(c) shows the cold configuration 781. Cold configuration 781 may be similar in some respects to hot configuration 711. Accordingly, cold configuration 781 may include an outer box 783, which may be identical to outer box 713, an insulated base 785, which may be identical to insulated base 715, an insulated lid 787, which may be identical to insulated lid 725, a payload container 789, which may be identical to payload container 723, and a temperature indicator 791, which may be identical to temperature indicator 721. (As is the case with hot configuration 711, payload container 789 of cold configuration 781 may be omitted.) Cold configuration 781 may differ from hot configuration 711 in at least the following respects: Whereas hot configuration 711 may include six phase-change elements 717-1 through 717-6, cold configuration 781 may include five phase-change elements 793-1 through 793-5. Phase-change elements 793-1 through 793-5, like phase-change elements 717-1 through 717-6, may be water-based gel packs; however, whereas, in hot configuration 711, phase-change elements 717-1, 717-5 and 717-6 may be preconditioned at +5° C. to a refrigerated liquid state and phase-change elements 717-2, 717-3 and 717-4 may be preconditioned at room temperature to a room temperature liquid state, in cold configuration 781, all of phase-change elements 793-1 through 793-5 may be preconditioned at room temperature to a room temperature liquid state. Cold configuration 781 may be assembled in a fashion analogous to that described above for hot configuration 711.

Referring to FIGS. 10(a)-10(c), there are shown hot, moderate, and cold configurations, respectively, for an 8L shipper (Model No. KT12109) designed for maintaining a payload within a refrigerated temperature range (e.g., +2° C. to +8° C.) for an extended period of time. FIG. 10(a) shows a hot configuration 811. Hot configuration 811 may comprise an outer box 813, which may be made of, for example, corrugated cardboard, an insulated base 815, which may be made of, for example, expanded polystyrene and which may be appropriately dimensioned to hold up to an 8L payload, a plurality of phase-change elements 817-1 through 817-6, which may be, for example, identical water-based gel packs preconditioned to a frozen/solid state at −5° C. to 0° C., a plurality of bubble wrap sheets 819-1 through 819-4, a temperature indicator 821, a payload container 823, which may be made of, for example, corrugated cardboard, and an insulated lid 825, which may mate with and be made of the same material as insulated base 815. (In some cases, payload container 823 may be omitted, with the payload not being contained within a separate payload container. Also, in some cases, temperature indicator 821 may be omitted.)

In use, insulated base 815 may be placed inside of outer box 813, and phase-change elements 817-1 and 817-2 may be placed within insulated base 815 on top of its inner bottom wall. Then, bubble wrap sheets 819-1 and 819-2 may be placed on top of phase-change elements 817-1 and 817-2. Then, the payload container 823 with payload (or the payload alone) may be centered within insulated base 815 and placed on top of bubble wrap sheets 819-1 and 819-2. Then, the temperature indicator 821 may be placed directly on top of the payload container 823 (or directly on top of the payload). Then, bubble wrap sheets 819-3 and 819-4 may be placed on top of temperature indicator 821. Then, phase-change elements 817-3 through 817-6 may be placed in two layers on top of bubble wrap sheets 819-3 and 819-4. Then, additional bubble wrap may be used to fill all void spaces. Then, the insulated lid 825 may be placed on top of insulated base 815, and the outer box 813 may be closed and taped shut.

FIG. 10(b) shows the moderate configuration 851. Moderate configuration 851 may be similar in some respects to hot configuration 811. Accordingly, moderate configuration 851 may include an outer box 853, which may be identical to outer box 813, an insulated base 855, which may be identical to insulated base 815, an insulated lid 857, which may be identical to insulated lid 825, a payload container 859, which may be identical to payload container 823, and a temperature indicator 861, which may be identical to temperature indicator 821. (As is the case with hot configuration 811, payload container 859 of moderate configuration 851 may be omitted.) Moderate configuration 851 may differ from hot configuration 811 in at least the following respects: First, whereas hot configuration 811 may include six phase-change elements 817-1 through 817-6, moderate configuration 851 may include six phase-change elements 863-1 through 863-6. Phase-change elements 863-1 through 863-6, like phase-change elements 817-1 through 817-6, may be water-based gel packs; however, whereas, in hot configuration 811, all six of phase-change elements 817-1 through 817-6 may be preconditioned at −5° C. to 0° C. to a frozen/solid state, in moderate configuration 851, phase-change elements 863-1 through 863-4 may be preconditioned at −5° C. to 0° ° C. to a frozen/solid state, and phase-change elements 863-5 and 863-6 may be preconditioned at +5° C. to a refrigerated liquid state. Second, whereas hot configuration 811 may include four bubble wrap sheets 819-1 through 819-4, moderate configuration 851 may include six bubble wrap sheets 865-1 through 865-6, with bubble wrap sheets 865-1 through 865-3 being disposed between phase-change elements 863-1 and 863-2 and the payload and with bubble wrap sheets 865-4 through 865-6 being disposed between phase-change elements 863-3 and 863-4 and phase change elements 863-5 and 863-6. Moderate configuration 851 may be assembled in a fashion analogous to that described above for hot configuration 811.

FIG. 10(c) shows the cold configuration 881. Cold configuration 881 may be similar in some respects to hot configuration 811. Accordingly, cold configuration 881 may include an outer box 883, which may be identical to outer box 813, an insulated base 885, which may be identical to insulated base 815, an insulated lid 887, which may be identical to insulated lid 825, a payload container 889, which may be identical to payload container 823, and a temperature indicator 891, which may be identical to temperature indicator 821. (As is the case with hot configuration 811, payload container 889 of cold configuration 881 may be omitted.) Cold configuration 881 may differ from hot configuration 811 in at least the following respects: First, whereas hot configuration 811 may include six phase-change elements 817-1 through 817-6, cold configuration 881 may include four phase-change elements 893-1 through 893-4. Phase-change elements 893-1 through 893-4, like phase-change elements 817-1 through 817-6, may be water-based gel packs; however, whereas, in hot configuration 811, all six of phase-change elements 817-1 through 817-6 may be preconditioned to a frozen/solid state, in cold configuration 881, phase-change elements 893-1 and 893-2 may be preconditioned at +5° C. to a refrigerated liquid state, and phase-change elements 893-3 and 893-4 may be preconditioned at −5° C. to 0° C. to a frozen/solid state. Second, whereas hot configuration 811 may include four bubble wrap sheets 819-1 through 819-4, cold configuration 881 may include two bubble wrap sheets 895-1 and 895-2, with bubble wrap sheets 895-1 and 895-2 being disposed between phase-change elements 893-1 and 893-2 and the payload. Cold configuration 881 may be assembled in a fashion analogous to that described above for hot configuration 811.

Referring now to FIGS. 11(a)-11(c), there are shown hot, moderate, and cold configurations, respectively, for an 8L shipper (Model No. KT12109) designed for maintaining a payload within a room temperature range (e.g., +15° C. to +25° C.) for an extended period of time. FIG. 11(a) shows the hot configuration 911. Hot configuration 911 may comprise an outer box 913, which may be made of, for example, corrugated cardboard, an insulated base 915, which may be made of, for example, expanded polystyrene and which may be appropriately dimensioned to hold up to an 8L payload, a plurality of phase-change elements 917-1 through 917-7, which may be, for example, identical water-based gel packs (with phase-change elements 917-1, 917-2, 917-6 and 917-7 being preconditioned to a refrigerated liquid state at +5° C. and with phase-change elements 917-3, 917-4 and 917-5 being preconditioned to a liquid state at room temperature), a temperature indicator 921, a payload container 923, which may be made of, for example, corrugated cardboard, and an insulated lid 927, which may mate with and be made of the same material as insulated base 915. (In some cases, payload container 923 may be omitted, with the payload not being contained within a separate payload container. Also, in some cases, temperature indicator 921 may be omitted.)

In use, insulated base 915 may be placed inside of outer box 913, and phase-change elements 917-1 and 917-2 may be placed within insulated base 915 on top of its inner bottom wall. Then, phase-change elements 917-3 and 917-4 may be placed on top of phase-change elements 917-1 and 917-2. Then, the payload container 923 with payload (or the payload alone) may be centered within insulated base 915 and placed on top of phase-change elements 917-3 and 917-4. Then, the temperature indicator 921 may be placed directly on top of the payload container 923 (or directly on top of the payload). Then, phase-change element 917-5 may be placed on top of temperature indicator 921. Then, phase-change elements 917-6 and 917-7 may be placed on top of phase-change element 917-5. Then, bubble wrap may be used to fill all void spaces. Then, the insulated lid 927 may be placed on top of insulated base 915, and the outer box 913 may be closed and taped shut.

FIG. 11(b) shows the moderate configuration 951. Moderate configuration 951 may be similar in some respects to hot configuration 911. Accordingly, moderate configuration 951 may include an outer box 953 that may be identical to outer box 913, an insulated base 955, which may be identical to insulated base 915, an insulated lid 957, which may be identical to insulated lid 927, a payload container 959, which may be identical to payload container 923, and a temperature indicator 961, which may be identical to temperature indicator 921. (As is the case with hot configuration 911, payload container 959 of moderate configuration 951 may be omitted.) Moderate configuration 951 may differ from hot configuration 911 in at least the following respects: Whereas hot configuration 911 may include seven phase-change elements 917-1 through 917-7, moderate configuration 951 may include four phase-change elements 963-1 through 963-4. Phase-change elements 963-1 through 963-4, like phase-change elements 917-1 through 917-7, may be water-based gel packs; however, whereas, in hot configuration 911, phase-change elements 917-1, 917-2, 917-6 and 917-7 may be preconditioned at +5° C. to a refrigerated liquid state and phase-change elements 917-3, 917-4 and 917-5 may be preconditioned at room temperature to a room temperature liquid state, in moderate configuration 951, all of phase-change elements 963-1 through 963-4 may be preconditioned at room temperature to a room temperature liquid state. Moderate configuration 951 may be assembled in a fashion analogous to that described above for hot configuration 911.

FIG. 11(c) shows the cold configuration 981. Cold configuration 981 may be similar in some respects to hot configuration 911. Accordingly, cold configuration 981 may include an outer box 983, which may be identical to outer box 913, an insulated base 985, which may be identical to insulated base 915, an insulated lid 987, which may be identical to insulated lid 927, a payload container 989, which may be identical to payload container 923, and a temperature indicator 991, which may be identical to temperature indicator 921. (As is the case with hot configuration 911, payload container 989 of cold configuration 981 may be omitted.) Cold configuration 981 may differ from hot configuration 911 in at least the following respects: Whereas hot configuration 911 may include seven phase-change elements 917-1 through 917-7 arranged in four layers, cold configuration 981 may include seven phase-change elements 993-1 through 993-7 arranged in three layers. Phase-change elements 993-1 through 993-7, like phase-change elements 917-1 through 917-7, may be water-based gel packs; however, whereas, in hot configuration 911, phase-change elements 917-1, 917-2, 917-6 and 917-7 may be preconditioned at +5° C. to a refrigerated liquid state and phase-change elements 917-3, 917-4 and 917-5 may be preconditioned at room temperature to a room temperature liquid state, in cold configuration 981, phase-change elements 993-1 through 993-7 may be preconditioned at room temperature to a room temperature liquid state. Cold configuration 981 may be assembled in a fashion analogous to that described above for hot configuration 911.

Referring to FIGS. 12(a)-12(c), there are shown hot, moderate, and cold configurations, respectively, for a 15L shipper (Model No. KT91) designed for maintaining a payload within a refrigerated temperature range (e.g., +2° C. to +8° C.) for an extended period of time. FIG. 12(a) shows a hot configuration 1011. Hot configuration 1011 may comprise an outer box 1013, which may be made of, for example, corrugated cardboard, an insulated base 1015, which may be made of, for example, expanded polystyrene and which may be appropriately dimensioned to hold up to a 15L payload, a plurality of phase-change elements 1017-1 through 1017-8, which may be, for example, identical water-based gel packs preconditioned to a frozen/solid state at −5° C. to 0° C., a plurality of bubble wrap sheets 1019-1 through 1019-8, a temperature indicator 1021, a payload container 1023, which may be made of, for example, corrugated cardboard, and an insulated lid 1025, which may mate with and be made of the same material as insulated base 1015. (In some cases, payload container 1023 may be omitted, with the payload not being contained within a separate payload container. Also, in some cases, temperature indicator 1021 may be omitted.)

In use, insulated base 1015 may be placed inside of outer box 1013, and phase-change elements 1017-1 through 1017-3 may be placed within insulated base 1015 on top of its inner bottom wall. Then, bubble wrap sheets 1019-1 and 1019-2 may be placed on top of phase-change elements 1017-1 and 1017-2. Then, the payload container 1023 with payload (or the payload alone) may be centered within insulated base 1015 and placed on top of bubble wrap sheets 1019-1 and 1019-2. Then, the temperature indicator 1021 may be placed directly on top of the payload container 1023 (or directly on top of the payload). Then, bubble wrap sheets 1019-3 and 1019-4 may be placed at one end of payload container 1023, and bubble wrap sheets 1019-5 and 1019-6 may be placed at the opposite end of payload container 1023. Then, phase-change element 1017-4 may be placed between bubble wrap sheet 1019-3 and the corresponding inside wall of base 1015, and phase-change element 1017-5 may be placed between bubble wrap sheet 1019-6 and the corresponding inside wall of base 1015. Then, bubble wrap sheets 1019-7 and 1019-8 may be placed on top of temperature indicator 1021. Then, phase-change elements 1017-6 through 1017-8 may be placed on top of bubble wrap sheets 1019-7 and 1019-8. Then, additional bubble wrap may be used to fill all void spaces. Then, the insulated lid 1025 may be placed on top of insulated base 1015, and the outer box 1013 may be closed and taped shut.

FIG. 12(b) shows the moderate configuration 1051. Moderate configuration 1051 may be similar in some respects to hot configuration 1011. Accordingly, moderate configuration 1051 may include an outer box 1053, which may be identical to outer box 1013, an insulated base 1055, which may be identical to insulated base 1015, an insulated lid 1057, which may be identical to insulated lid 1025, a payload container 1059, which may be identical to payload container 1023, and a temperature indicator 1061, which may be identical to temperature indicator 1021. (As is the case with hot configuration 1011, payload container 1059 of moderate configuration 1051 may be omitted.) Moderate configuration 1051 may differ from hot configuration 1011 in at least the following respects: First, whereas hot configuration 1011 may include eight phase-change elements 1017-1 through 1017-8, moderate configuration 1051 may include six phase-change elements 1063-1 through 1063-6. Phase-change elements 1063-1 through 1063-6, like phase-change elements 1017-1 through 1017-8, may be water-based gel packs; however, whereas, in hot configuration 1011, all eight of phase-change elements 1017-1 through 1017-8 may be preconditioned at −5° C. to 0° ° C. to a frozen/solid state, in moderate configuration 1051, phase-change elements 1063-1 through 1063-5 may be preconditioned at FIG. 12(b) shows the moderate configuration 1051. Moderate configuration 1051 may be similar in some respects to hot configuration 1011. Accordingly, moderate configuration 1051 may include an outer box 1053, which may be identical to outer box 1013, an insulated base 1055, which may be identical to insulated base 1015, an insulated lid 1057, which may be identical to insulated lid 1025, a payload container 1059, which may be identical to payload container 1023, and a temperature indicator 1061, which may be identical to temperature indicator 1021. (As is the case with hot configuration 1011, payload container 1059 of moderate configuration 1051 may be omitted.) Moderate configuration 1051 may differ from hot configuration 1011 in at least the following respects: First, whereas hot configuration 1011 may include eight phase-change elements 1017-1 through 1017-8, moderate configuration 1051 may include six phase-change elements 1063-1 through 1063-6. Phase-change elements 1063-1 through 1063-6, like phase-change elements 1017-1 through 1017-8, may be water-based gel packs; however, whereas, in hot configuration 1011, all eight of phase-change elements 1017-1 through 1017-8 may be preconditioned at −5° C. to 0° ° C. to a frozen/solid state, in moderate configuration 1051, phase-change elements 1063-1 through 1063-5 may be preconditioned at −5° C. to 0° ° C. to a frozen/solid state, and phase-change element 1063-6 may be preconditioned at +5° C. to a refrigerated liquid state. Second, whereas hot configuration 1011 may include eight bubble wrap sheets 1019-1 through 1019-8, moderate configuration 1051 may include six bubble wrap sheets 1065-1 through 1065-6, with bubble wrap sheets 1065-1 through 1065-3 being disposed between phase-change elements 1063-1, 1063-2 and 1063-6 and the payload and with bubble wrap sheets 1065-4 through 1065-6 being disposed between phase-change elements 1063-3 through 1063-5 and temperature indicator 1061. Moderate configuration 1051 may be assembled in a fashion analogous to that described above for hot configuration 1011.

FIG. 12(c) shows the cold configuration 1081. Cold configuration 1081 may be similar in some respects to hot configuration 1011. Accordingly, cold configuration 1081 may include an outer box 1083, which may be identical to outer box 1013, an insulated base 1085, which may be identical to insulated base 1015, an insulated lid 1087, which may be identical to insulated lid 1025, a payload container 1089, which may be identical to payload container 1023, and a temperature indicator 1091, which may be identical to temperature indicator 1021. (As is the case with hot configuration 1011, payload container 1089 of cold configuration 1081 may be omitted.) Cold configuration 1081 may differ from hot configuration 1011 in at least the following respects: First, whereas hot configuration 1011 may include eight phase-change elements 1017-1 through 1017-8, cold configuration 1081 may include six phase-change elements 1093-1 through 1093-6. Phase-change elements 1093-1 through 1093-6, like phase-change elements 1017-1 through 1017-8, may be water-based gel packs; however, whereas, in hot configuration 1011, all eight of phase-change elements 1017-1 through 1017-8 may be preconditioned to a frozen/solid state, in cold configuration 1081, phase-change elements 1093-1 through 1093-3 may be preconditioned at +5° C. to a refrigerated liquid state, and phase-change elements 1093-4 and 1093-6 may be preconditioned at −5° ° C. to 0° ° C. to a frozen/solid state. Second, whereas hot configuration 1011 may position its phase-change elements on four different sides of the payload, cold configuration 1081 only positions its phase-change elements above the payload. Third, whereas hot configuration 1011 may include bubble wrap sheets 1019-1 through 1019-8 and may position such bubble wrap sheets on four sides of the payload, cold configuration 1081 may include two bubble wrap sheets 1095-1 and 1095-2, with bubble wrap sheets 1095-1 and 1095-2 being disposed between phase-change element 1093-1 through 1093-3 and the payload. Cold configuration 1081 may be assembled in a fashion analogous to that described above for hot configuration 1011.

Referring now to FIGS. 13(a)-13(c), there are shown hot, moderate, and cold configurations, respectively, for a 15L shipper (Model No. KT92) designed for maintaining a payload within a room temperature range (e.g., +15° C. to +25° C.) for an extended period of time. FIG. 13(a) shows the hot configuration 1111. Hot configuration 1111 may comprise an outer box 1113, which may be made of, for example, corrugated cardboard, an insulated base 1115, which may be made of, for example, expanded polystyrene and which may be appropriately dimensioned to hold up to a 15L payload, a plurality of phase-change elements 1117-1 through 1117-8, which may be, for example, identical water-based gel packs (with phase-change elements 1117-1, 1117-3, 1117-6, 1117-7 and 1117-8 being preconditioned to a refrigerated liquid state at +5° C. and with phase-change elements 1117-2, 1117-4 and 1117-5 being preconditioned to a liquid state at room temperature), a temperature indicator 1121, a payload container 1123, which may be made of, for example, corrugated cardboard, an insulated lid 1125, which may mate with and be made of the same material as insulated base 1115, and a sheet of bubble wrap 1127. (In some cases, payload container 1123 may be omitted, with the payload not being contained within a separate payload container. Also, in some cases, temperature indicator 1121 may be omitted.)

In use, insulated base 1115 may be placed inside of outer box 1113, and phase-change elements 1117-1 through 1117-3 may be placed within insulated base 1115 on top of its inner bottom wall. (Preferably, phase-change elements 1117-1 and 1117-3 are spread apart from each other on base 1115 as much as possible.) Then, bubble wrap 1127 may be placed on top of phase-change elements 1117-1 through 1117-3. Then, the payload container 1123 with payload (or the payload alone) may be centered within insulated base 1115 and placed on top of bubble wrap 1127. Then, the temperature indicator 1121 may be placed directly on top of the payload container 1123 (or directly on top of the payload). Then, phase-change elements 1117-4 and 1117-5 may be placed on top of temperature indicator 1121. Then, phase-change elements 1117-6 through 1117-8 may be placed on top of phase-change elements 1117-4 and 1117-5. Then, bubble wrap may be used to fill all void spaces. Then, the insulated lid 1125 may be placed on top of insulated base 1115, and the outer box 1113 may be closed and taped shut.

FIG. 13(b) shows the moderate configuration 1151. Moderate configuration 1151 may be similar in some respects to hot configuration 1111. Accordingly, moderate configuration 1151 may include an outer box 1153, which may be identical to outer box 1113, an insulated base 1155, which may be identical to insulated base 1115, an insulated lid 1157, which may be identical to insulated lid 1125, a payload container 1159, which may be identical to payload container 1123, and a temperature indicator 1161, which may be identical to temperature indicator 1121. (As is the case with hot configuration 1111, payload container 1159 of moderate configuration 1151 may be omitted.) Moderate configuration 1151 may differ principally from hot configuration 1111 in the following respects: Whereas hot configuration 1111 may include eight phase-change elements 1117-1 through 1117-8, moderate configuration 1151 may include six phase-change elements 1163-1 through 1163-6. Phase-change elements 1163-1 through 1163-6, like phase-change elements 1117-1 through 1117-8, may be water-based gel packs; however, whereas, in hot configuration 1111, phase-change elements 117-1, 1117-3, 1117-6, 1117-7 and 1117-8 may be preconditioned at +5° C. to a refrigerated liquid state and phase-change elements 1117-2, 1117-4 and 1117-5 may be preconditioned at room temperature to a room temperature liquid state, in moderate configuration 1151, all of phase-change elements 1163-1 through 1163-6 may be preconditioned at room temperature to a room temperature liquid state. Moderate configuration 1151 may also omit the bubble wrap sheet found in hot configuration 1111. Moderate configuration 1151 may be assembled in a fashion analogous to that described above for hot configuration 1111.

FIG. 13(c) shows the cold configuration 1181. Cold configuration 1181 may be similar in some respects to hot configuration 1111. Accordingly, cold configuration 1181 may include an outer box 1183, which may be identical to outer box 1113, an insulated base 1185, which may be identical to insulated base 1115, an insulated lid 1187, which may be identical to insulated lid 1125, a payload container 1189, which may be identical to payload container 1123, and a temperature indicator 1191, which may be identical to temperature indicator 1121. (As is the case with hot configuration 1111, payload container 1189 of cold configuration 1181 may be omitted.) Cold configuration 1181 may differ from hot configuration 1111 in the following respects: Whereas hot configuration 1111 may include eight phase-change elements 1117-1 through 1117-8 arranged in three layers, cold configuration 1181 may include seven phase-change elements 1193-1 through 1193-7 arranged in four layers. Phase-change elements 1193-1 through 1193-7, like phase-change elements 1117-1 through 1117-8, may be water-based gel packs; however, whereas, in hot configuration 1111, phase-change elements 1117-1, 1117-3, 1117-6, 1117-7 and 1117-8 may be preconditioned at +5° ° C. to a refrigerated liquid state and phase-change elements 1117-2, 1117-4 and 1117-5 may be preconditioned at room temperature to a room temperature liquid state, in cold configuration 1181, all of phase-change elements 1193-1 through 1193-7 may be preconditioned at room temperature to a room temperature liquid state. Cold configuration 1181 may be assembled in a fashion analogous to that described above for hot configuration 1111.

It is to be understood that the various shipper configurations of FIGS. 6(a) through 11(c) are merely illustrative of the present invention and that the present invention is not limited to the particular shipper configurations shown therein.

The embodiments of the present invention described above are intended to be merely exemplary and those skilled in the art shall be able to make numerous variations and modifications to it without departing from the spirit of the present invention. All such variations and modifications are intended to be within the scope of the present invention.

What is claimed is:

1. A method for customized assembly of a shipper for a shipping party, the shipping party having a compute device, the shipper being adapted to transport temperature-sensitive materials, the method comprising the steps of:
   (a) electronically receiving shipment parameter data, via the Internet, by a central controller, the shipment parameter data being input via the compute device, the shipment parameter data comprising a shipment origin, a shipment destination, a payload size, a desired payload temperature range, and a courier, wherein the payload size is selected from a pre-set list of a plurality of possible payload size options, wherein the desired payload temperature range is selected from a pre-set list of a plurality of possible payload temperature range options, and wherein the courier is selected from a pre-set list of a plurality of possible courier options;
   (b) electronically retrieving data, via the Internet, by the central controller relating to an intended shipment travel path based on the shipment origin, the shipment destination, and the courier;
   (c) electronically retrieving forecasted temperature data, via the Internet, by the central controller relating to the intended shipment travel path;
   (d) calculating an average forecasted ambient temperature by the central controller for the intended shipment travel path;
   (e) cross-referencing by the central controller of the calculated average forecasted ambient temperature, the inputted payload size, and the inputted desired payload temperature range against a stored shipment solution table to select an optimal shipper, wherein the stored shipment solution table has a pre-set list of exactly three possible shipper configurations for a given payload size and a given desired payload temperature range, wherein said exactly three possible shipper configurations are a hot configuration, where the calculated average forecasted ambient temperature is above a predetermined upper threshold, a cold configuration, where the calculated average forecasted ambient temperature is below a predetermined lower threshold, and a moderate configuration, where the calculated average forecasted ambient temperature is at least as great as the predetermined lower threshold and no greater than the predetermined upper threshold, wherein the hot configuration comprises a first collection of gel packs, wherein the cold configuration comprises a second collection of gel packs, wherein the moderate configuration comprises a third collection of gel packs, wherein the first, second, and third collections of gel packs differ from one another in gel pack quantity and/or gel pack preconditioned temperature, wherein one of the first, second, and third collections of gel packs comprises a plurality of gel packs all preconditioned to the same state, and wherein another one of the first, second, and third collections of gel packs comprises at least two gel packs preconditioned to different states or temperatures;

(f) providing details of the selected optimal shipper to the compute device, wherein the details include a disclosure of which one of the first, second, and third collections of gel packs is to be utilized in the selected optimal shipper and pack-out instructions for the selected optimal shipper;

(g) providing a supply of identical gel packs alternatively usable to form the first, second, and third collections of gel packs;

(h) preconditioning, via temperature, one or more gel packs from the supply of identical gel packs to yield a combination of gel packs corresponding to that disclosed in step (f), wherein said preconditioning is different for the hot configuration, the moderate configuration, and the cold configuration in terms of preconditioning temperature(s) and/or number(s) of gel packs and wherein, for at least one of the hot configuration, the moderate configuration, and the cold configuration, said preconditioning comprises preconditioning at least one of the one or more gel packs from room temperature to one of a frozen state and a refrigerated temperature; and (i) then, assembling the selected optimal shipper using the preconditioned gel packs of step (h), wherein said assembly comprises (A) providing an insulated base, and (B) positioning the preconditioned gel packs of step (h), a payload, and any needed bubble wrap sheets within the insulated base in accordance with the pack-out instructions for the selected optimal shipper, and (C) positioning an insulated lid on the insulated base.

2. The method as claimed in claim 1 wherein the desired courier is selected from at least one ground courier and at least one air courier.

3. The method as claimed in claim 1 wherein the desired payload temperature range is selected from a refrigerated range and a room temperature range.

4. The method as claimed in claim 3 wherein the refrigerated range is +2° C. to +8° C.

5. The method as claimed in claim 3 wherein the room temperature range is +15° C. to +25° C.

6. The method as claimed in claim 1 wherein the forecasted temperature data is retrieved from a plurality of independent sources.

7. The method as claimed in claim 1 wherein the average forecasted ambient temperature is calculated by averaging the forecasted temperature at regular time intervals along the intended shipment travel path.

8. The method as claimed in claim 7 wherein the regular time intervals are one-hour intervals.

9. The method of claim 1 wherein the step of providing details of the selected optimal shipper to the compute device comprises displaying a pack-out diagram of the selected shipper.

10. A method for customized assembly of a shipper for a shipping party, the shipping party having a compute device, the shipper being adapted to transport temperature-sensitive materials, the method comprising the steps of:

(a) electronically receiving shipment parameter data by a central controller, the shipment parameter data being input via the compute device, the shipment parameter data comprising a shipment origin, a shipment destination, a payload size, a desired payload temperature range, and a courier, wherein the payload size is selected from a pre-set list of a plurality of possible payload size options, wherein the desired payload temperature range is selected from a pre-set list of a plurality of possible payload temperature range options, and wherein the courier is selected from a pre-set list of a plurality of possible courier options;

(b) providing, for each payload size, an insulated base, an insulated lid, a supply of bubble wrap sheets, and a supply of identical gel packs;

(c) electronically retrieving data by the central controller relating to an intended shipment travel path based on the shipment origin, the shipment destination, and the courier;

(d) electronically retrieving forecasted temperature data by the central controller relating to the intended shipment travel path;

(e) calculating an average forecasted ambient temperature by the central controller for the intended shipment travel path;

(f) cross-referencing by the central controller of the calculated average forecasted ambient temperature, the inputted payload size, and the inputted desired payload temperature range against a stored shipment solution table to select an optimal shipper, wherein the stored shipment solution table has a pre-set list of exactly three possible shipper configurations for a given payload size and a given desired payload temperature range, wherein said exactly three possible shipper configurations are a hot configuration, where the calculated average forecasted ambient temperature is above a predetermined upper threshold, the hot configuration employing a first collection of gel packs, a cold configuration, where the calculated average forecasted ambient temperature is below a predetermined lower threshold, the cold configuration employing a second collection of gel packs, and a moderate configuration, where the calculated average forecasted ambient temperature is at least as great as the predetermined lower threshold and no greater than the predetermined upper threshold, the moderate configuration employing a third collection of gel packs, wherein the first, second and third collections of gel packs are different from one another in gel pack quantity and/or gel pack preconditioned temperature, wherein one of the first, second, and third collections of gel packs comprises a plurality of gel packs all preconditioned to the same state, wherein another one of the first, second and third collections of gel packs comprises at least two gel packs preconditioned to different states or temperatures, and wherein the supply of identical gel packs is alternatively usable to form the first, second, and third collections of gel packs;

(g) providing details of the selected optimal shipper to the compute device, wherein the details include a disclosure of which one of the first, second, and third collections of gel packs is to be utilized in the selected optimal shipper and pack-out instructions for the selected optimal shipper;

(h) preconditioning, via temperature, one or more of the gel packs from the supply of identical gel packs to correspond to the collection of gel packs of the selected optimal shipper, wherein said preconditioning is different for the hot configuration, the moderate configuration, and the cold configuration in terms of preconditioning temperature(s) and/or number(s) of gel packs and wherein, for at least one of the hot configuration, the moderate configuration, and the cold configuration, said preconditioning comprises preconditioning at least one of the one or more gel packs from room temperature to one of a frozen state and a refrigerated temperature; and (i) then, assembling the selected optimal shipper using the preconditioned gel packs of step (h), wherein said assembly comprises (A) positioning the preconditioned gel packs of step (h), a payload, and any needed bubble wrap sheets within the insulated base in accordance with the pack-out instructions for the selected optimal shipper, and (B) positioning the insulated lid on the insulated base.

* * * * *